US012613150B2

(12) United States Patent
Yazawa et al.

(10) Patent No.: US 12,613,150 B2
(45) Date of Patent: Apr. 28, 2026

(54) LOAD SENSING APPARATUS WITH PRESSING MEMBER HAVING ELASTIC MEMBER AND RIGID PRESSING PORTION

(71) Applicant: Alps Alpine Co., Ltd., Tokyo (JP)

(72) Inventors: Hisayuki Yazawa, Niigata-ken (JP); Hisanobu Okawa, Niigata-ken (JP); Ayako Otsuka, Niigata-ken (JP); Daisuke Tsuchiya, Niigata-ken (JP); Tatsuru Ikarashi, Niigata-ken (JP)

(73) Assignee: Alps Alpine Co., Ltd., Tokyo (JP)

( * ) Notice: Subject to any disclaimer, the term of this patent is extended or adjusted under 35 U.S.C. 154(b) by 475 days.

(21) Appl. No.: 18/154,535

(22) Filed: Jan. 13, 2023

(65) Prior Publication Data

US 2023/0152168 A1     May 18, 2023

Related U.S. Application Data

(63) Continuation of application No. PCT/JP2021/029379, filed on Aug. 6, 2021.

(30) Foreign Application Priority Data

Aug. 12, 2020     (JP) ................................. 2020-136350

(51) Int. Cl.
  *G01L 1/18*          (2006.01)
  *G01L 1/04*          (2006.01)
(52) U.S. Cl.
  CPC . *G01L 1/18* (2013.01); *G01L 1/04* (2013.01)
(58) Field of Classification Search
  CPC ......... G01L 1/18; G01L 1/2293; G01L 5/228; H01H 35/2685; H01H 35/2692;
  (Continued)

(56) References Cited

U.S. PATENT DOCUMENTS 4,561,447 A * 12/1985 Kawamura ............ A61B 5/021
                                                            600/500
4,763,097 A * 8/1988 Kant ........................ G01L 1/26
                                                            73/862.632
(Continued)

FOREIGN PATENT DOCUMENTS

JP          2001-281074        10/2001
JP          2002-124404        4/2002
(Continued)

OTHER PUBLICATIONS

International Search Report from International Application No. PCT/JP2021/029379 dated Oct. 19, 2021.

(Continued)

*Primary Examiner* — Tran M. Tran
(74) *Attorney, Agent, or Firm* — Beyer Law Group LLP

(57)                    ABSTRACT

A load sensing apparatus according to an aspect of the present invention includes a load sensing element including a pressure sensing portion, a housing that houses the load sensing element, and a pressing member supported by the housing, wherein the pressing member includes an elastic member that receives a load, a stiff pressing portion that is to come into contact with the pressure sensing portion, and an elastic supporting portion that supports the stiff pressing portion in the housing. When no load is applied to the pressing member, a gap is formed between the stiff pressing portion and the pressure sensing portion.

18 Claims, 33 Drawing Sheets

(58) Field of Classification Search
CPC ...... H01H 35/006; H01H 21/24; H01H 21/88; H01H 21/86; H01H 21/44; H01H 13/46; H01H 2013/525
See application file for complete search history.

(56) References Cited

U.S. PATENT DOCUMENTS

| | | | | |
|---|---|---|---|---|
| 5,786,549 | A * | 7/1998 | Serizawa ............. | G01L 1/2243 |
| | | | | 177/229 |
| 7,554,167 | B2 * | 6/2009 | Vaganov ............... | G06F 3/0338 |
| | | | | 257/730 |
| 7,880,247 | B2 * | 2/2011 | Vaganov ............... | G06F 3/0338 |
| | | | | 257/730 |
| 8,096,196 | B2 * | 1/2012 | Eilersen ................ | G01L 9/0072 |
| | | | | 73/862.626 |
| 8,350,345 | B2 * | 1/2013 | Vaganov ............... | G06F 3/0338 |
| | | | | 257/419 |
| 9,559,030 | B2 * | 1/2017 | Gocho .................... | H01L 24/17 |
| 9,664,576 | B2 * | 5/2017 | Sato ...................... | G01L 1/2225 |
| 9,714,875 | B2 * | 7/2017 | Ayon ........................ | G01L 1/16 |
| 10,162,425 | B2 * | 12/2018 | Nakamura ............. | H01H 13/78 |
| 10,345,161 | B2 * | 7/2019 | Caltabiano ................ | G01L 1/18 |
| 10,444,862 | B2 * | 10/2019 | Schediwy ............. | G06F 3/0445 |
| 10,894,311 | B2 * | 1/2021 | Yamashita ............. | H01H 9/061 |
| 11,199,459 | B2 * | 12/2021 | Uchida ................. | G01L 1/2287 |
| 11,309,143 | B2 * | 4/2022 | Miyamoto ............. | H01H 13/14 |
| 11,830,686 | B2 * | 11/2023 | Fehling ................. | H01H 13/30 |
| 11,851,319 | B2 * | 12/2023 | Pomarico ................. | B60T 8/17 |
| 11,929,216 | B1 * | 3/2024 | Hsieh ................. | H01H 13/7065 |
| 11,953,932 | B2 * | 4/2024 | Luu .......................... | G05G 1/42 |
| 11,984,277 | B2 * | 5/2024 | Suzuki ................... | H01H 13/20 |
| 12,026,316 | B2 * | 7/2024 | Takahashi ................ | B06B 1/04 |
| 12,241,799 | B2 * | 3/2025 | Yazawa .................... | G01L 1/18 |
| 2017/0343430 | A1 | 11/2017 | Caltabiano et al. | |

FOREIGN PATENT DOCUMENTS

| | | |
|---|---|---|
| JP | 2014-142777 | 8/2014 |
| JP | 2015-152429 | 8/2015 |
| WO | 2019/167688 | 9/2019 |

OTHER PUBLICATIONS

Japanese Notice of Reasons for Refusal with translation dated Aug. 21, 2023 from Japanese Application No. 2022-542838.
Japanese Notice of Reasons for Refusal with translation dated Aug. 8, 2024 from Japanese Application No. 2024-005444.
Chinese Office Action with translation dated Jan. 20, 2025 from Chinese Application No. 202180056487.3.

* cited by examiner

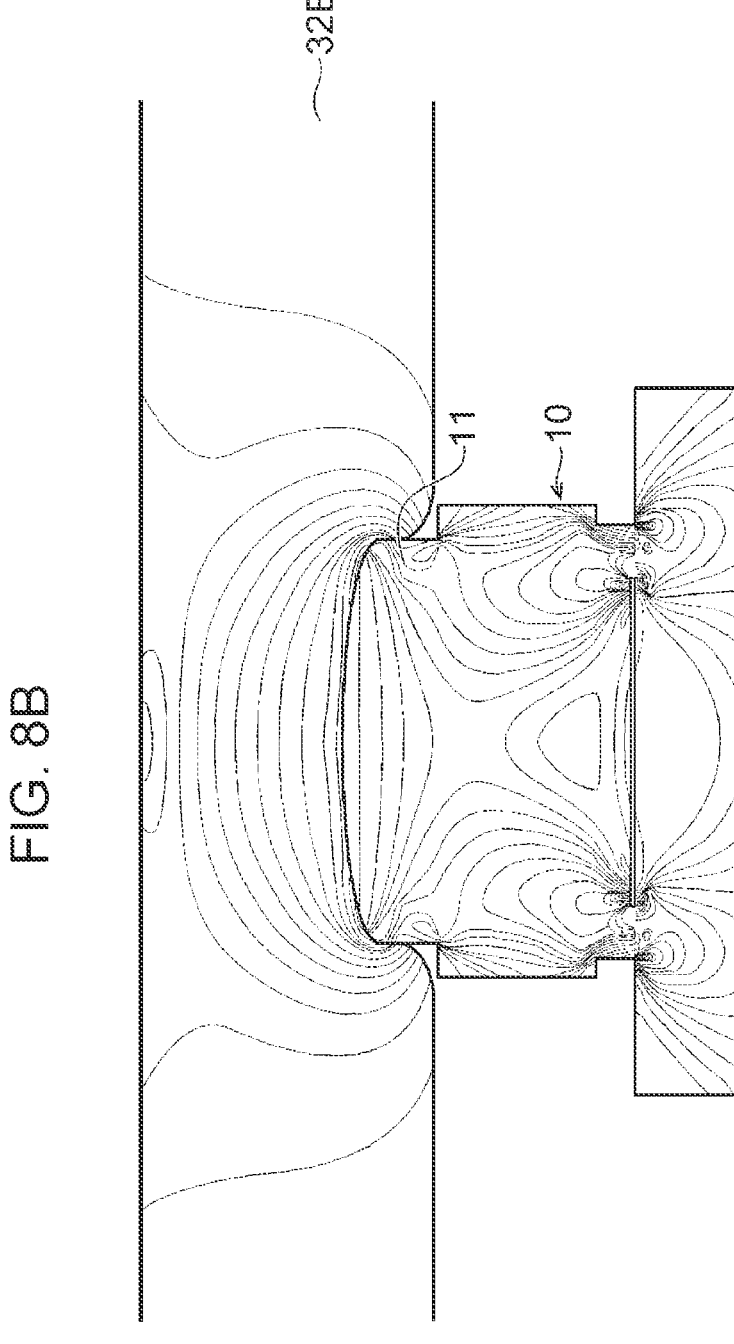
FIG. 8B
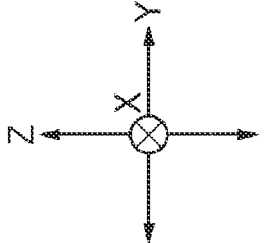

LOAD SENSING APPARATUS WITH PRESSING MEMBER HAVING ELASTIC MEMBER AND RIGID PRESSING PORTION

CLAIM OF PRIORITY

This application is a Continuation of International Application No. PCT/JP2021/029379 filed on Aug. 6, 2021, which claims benefit of Japanese Patent Application No. 2020-136350 filed on Aug. 12, 2020. The entire contents of each application noted above are hereby incorporated by reference.

BACKGROUND OF THE INVENTION

1. Field of the Invention

The present invention relates to a load sensing apparatus for detecting a load.

2. Description of the Related Art

Load sensors for detecting a load have recently been widely used in electronic devices and so on. Japanese Unexamined Patent Application Publication No. 2002-124404 discloses a force detecting apparatus including a substrate including at least two force-detecting conductive lands and a common conductive land provided between them, an elastic plate made of conductive rubber or conductive elastomer opposed to the force-detecting conductive lands and the common conductive land, a contact-resistance generating surface including many microspikes formed on a surface of the elastic plate facing the force-detecting conductive lands, and a flat conductive elastic contact point formed on a surface of the elastic plate facing the common conductive land.

Japanese Unexamined Patent Application Publication No. 2014-142777 discloses a touch-panel input operation apparatus including a touch panel that is made of a transparent material, that includes an operating surface with which a subject who performs an input operation to come into contact, and that includes a touch sensor that detects a position where the subject comes into contact with the operating surface and outputs a signal, an upper holder holding the upper part of the touch panel and including an opening that opens the operating surface, a lower holder made of a light guiding member and disposed on the back of the touch panel and holding the lower part of the touch panel, a casing disposed on the back of the lower holder, a light source that introduces light to the lower holder made of a light guiding member, a pressure switch disposed between the lower holder and the casing and operated when the operating surface of the touch panel is pressed to output a pressure signal that confirms the input to the touch sensor, and a circuit board on which the pressure switch and the light source are mounted.

International Publication No. WO2019/167688 discloses a pressure-sensitive apparatus including a pressure sensor having a pressure sensitive surface, an elastic film member fixed to the periphery of the pressure sensitive surface so as to be opposed at a certain distance from the pressure sensitive surface, and an elastic member disposed between the pressure sensitive surface and the film member and transmitting a force applied to the film member to the pressure sensitive surface.

Load sensors for detecting a load require high detection accuracy and linearity of the detected value for the load and also tolerances necessary in housing a load sensing element in a housing for assembly. For example, if a member subjected to a load and the load sensing element need to be in contact with each other in assembly, the member subjected to the load and the load sensing element have to be accurately aligned, which makes the assembly difficult.

SUMMARY OF THE INVENTION

The present invention provides a load sensing apparatus configured to obtain high-accuracy detected values and sufficient tolerances in assembly.

In an aspect of the present invention, a load sensing apparatus includes a load sensing element including a pressure sensing portion, a housing that houses the load sensing element, and a pressing member supported by the housing, wherein the pressing member includes an elastic member that receives a load, a stiff pressing portion that is to come into contact with the pressure sensing portion; and an elastic supporting portion that supports the stiff pressing portion in the housing, and wherein, when no load is applied to the pressing member, a gap is formed between the stiff pressing portion and the pressure sensing portion.

With this configuration, the elasticity of the pressing member allows the load applied when the elastic member is pressed to be transmitted from the elastic member to the pressure sensing portion via the elastic supporting portion and the stiff pressing portion. In this case, the stiff pressing portion, which comes into contact with the pressure sensing portion, is made of, for example, a highly stiff material. This reduces or eliminates runout of the load, thereby enhancing the detection sensitivity. The presence of the gap between the stiff pressing portion and the pressure sensing portion allows providing tolerances in assembly.

In the load sensing apparatus, the elastic supporting portion may include a plate spring. The plate spring shape of the elastic supporting portion allows the load to be easily transmitted to the pressure sensing portion. In the load sensing apparatus, the elastic supporting portion may be part of the elastic member. This can simplify the apparatus configuration.

In the load sensing apparatus, a stiff plate may be provided between the elastic member and the stiff pressing portion. Providing the stiff plate allows reducing or eliminating runout of the load transmitted from the elastic member to the stiff pressing portion, thereby improving the measurement accuracy.

In the load sensing apparatus, the load sensing element preferably includes a displacement portion that is displaced by the load received by the pressure sensing portion and a plurality of piezoresistive elements that electrically detect an amount of displacement of the displacement portion. The use of such a load sensing element including the plurality of piezoresistive elements can enhance the linearity of load measurement.

In the load sensing apparatus, the stiff pressing portion may include metal or silicon. This enhances the durability at the contact between the stiff pressing portion and the pressure sensing portion of the load sensing element.

In the load sensing apparatus, the elastic member may include metal. This allows the load to be efficiently transmitted from the metal elastic member to the stiff pressing portion.

In the load sensing apparatus, the elastic member may include a first contact portion including a first contact point that receives the load, a second contact portion including a second contact point that is to come into contact with the stiff pressing portion, and a vertical portion provided between the first contact portion and the second contact portion and for forming a space between the first contact portion and the second contact portion, wherein, when a load is applied to the pressing member, the second contact portion may be elastically deformed toward the space by resistance from the stiff pressing portion. This allows the load to be efficiently transmitted to the pressure sensing portion while absorbing the resistance from the stiff pressing portion generated when the load is applied to the pressing member to be absorbed using the elastic deformation of the second contact portion. In this case, a structure in which the elastic deformation of the second contact portion occurs earlier than the elastic deformation of the vertical portion is preferable in the viewpoint of efficient transmission of the pressure received from the first contact point to the stiff pressing portion.

In the load sensing apparatus, the first contact portion, the second contact portion, and the vertical portion are preferably made of a metal plate into a single piece. This allows the elastic member to be made of one metal plate. In this case, when the second contact portion is formed of the opposite ends of the metal plate, joining the opposite ends together to form the second contact portion is preferable in the viewpoint of efficient transmission of the pressure received from the first contact point to the stiff pressing portion.

The load sensing apparatus may further include an integrated circuit housed in the housing and having the load sensing element thereon. This allows the load sensing apparatus to have the function of the integrated circuit.

In the load sensing apparatus, the housing may include a restricting portion that restricts motion of the stiff pressing portion in a direction perpendicular to a pushing direction. This allows reducing or eliminating the friction between the stiff pressing portion and the pressure sensing portion.

The load sensing apparatus may further include a cover that is disposed at an opposite side of the pressing member from the housing and that applies a load to the elastic member. This allows the load received with the cover to be transmitted from the pressing member to the load sensing element via the stiff pressing portion.

In the load sensing apparatus, the cover may include a protruding portion that is to come into contact with the elastic member. This allows the load to be efficiently transmitted from the protruding portion of the cover to the elastic member.

In the load sensing apparatus, the elastic member may be integrated with the protruding portion or connected to the protruding portion. This allows the load to be transmitted from the protruding portion of the cover to the elastic member without loss.

The load sensing apparatus may further include a stopper that restricts a decrease in relative distance between the cover and the housing. This stopper restricts a decrease in distance between the cover and the housing, thereby preventing an overload on the load sensing element.

BRIEF DESCRIPTION OF THE DRAWINGS

FIG. 8B is an enlarged stress distribution chart of a pressure sensing portion and a pressing portion;

5

Figure 22:
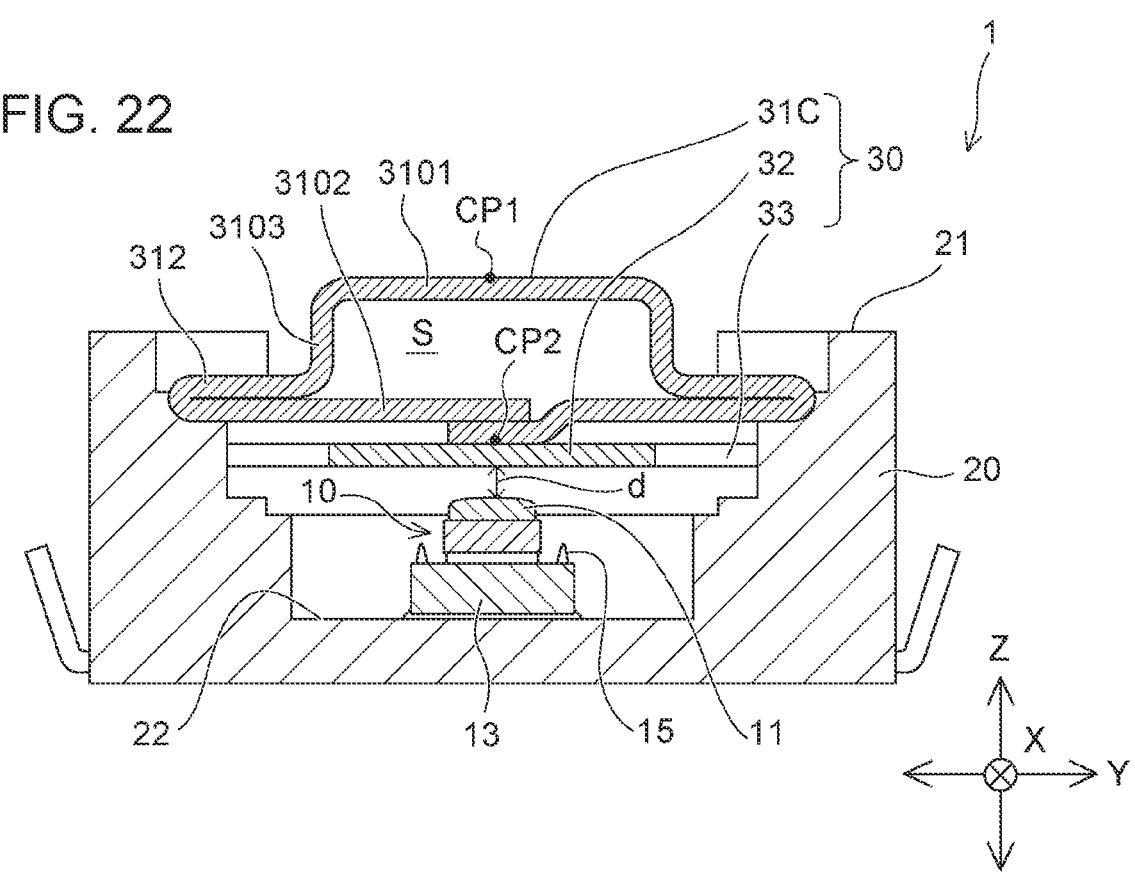
Figure 23:
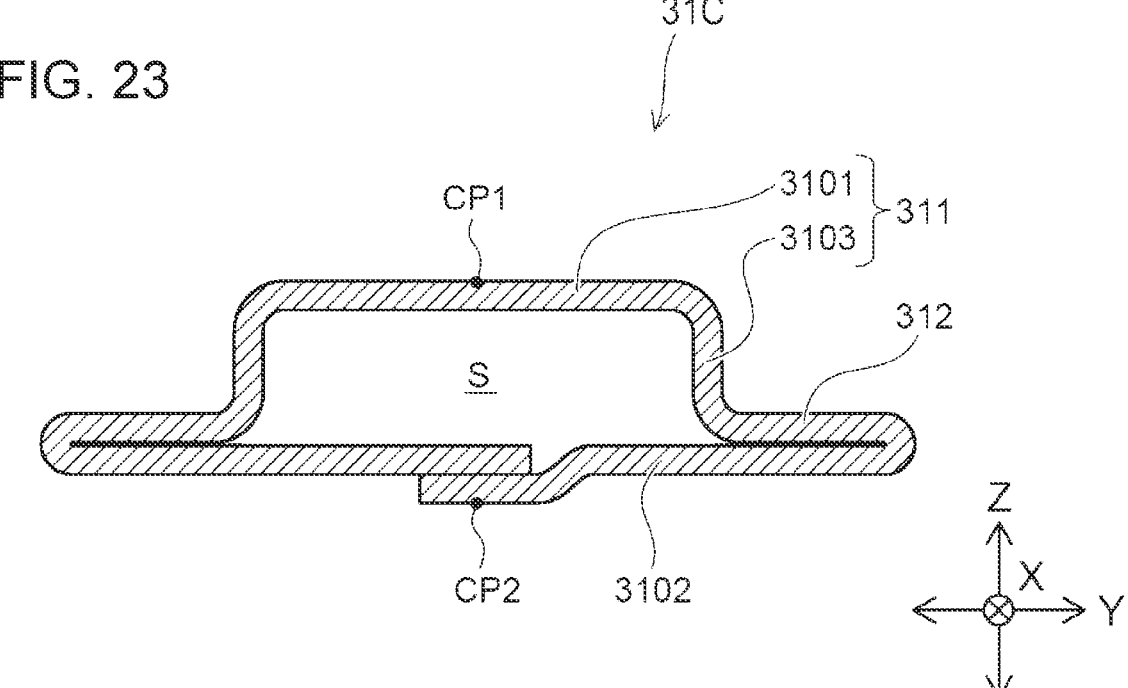
Figure 24A:
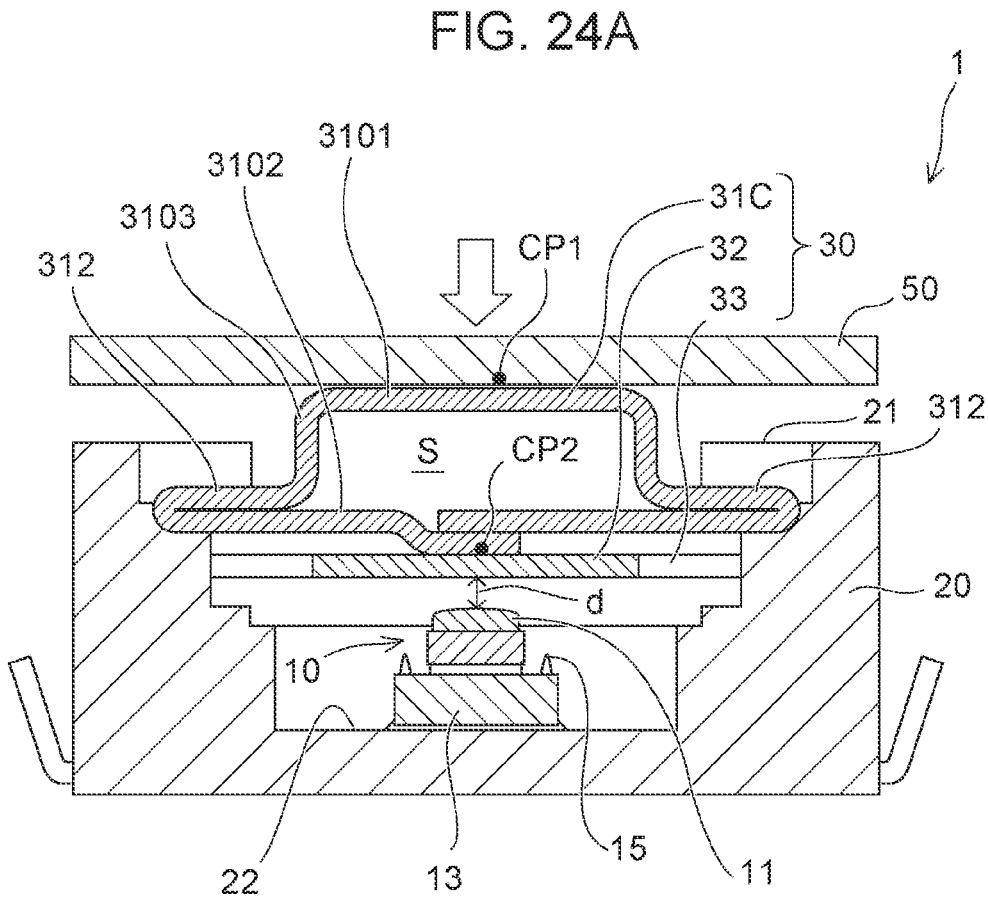
Figure 24A:
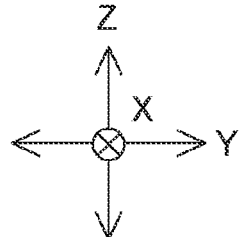
Figure 24B:
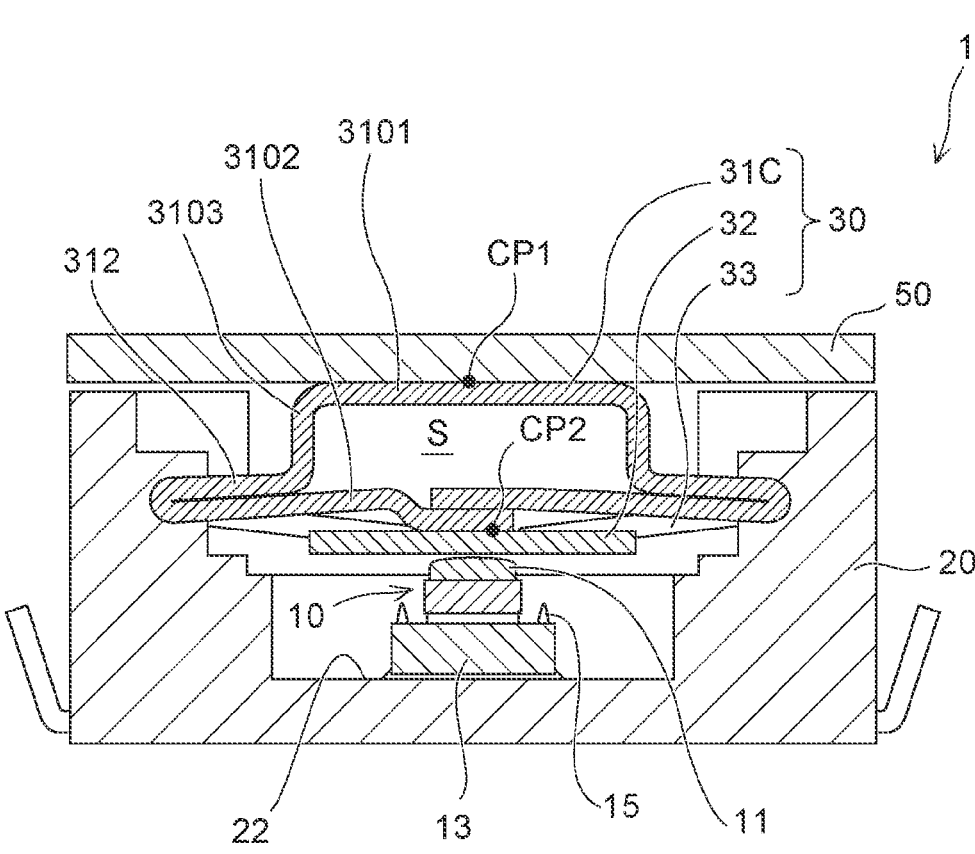
Figure 24B:
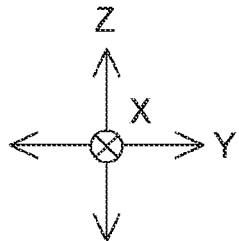
Figure 25A:
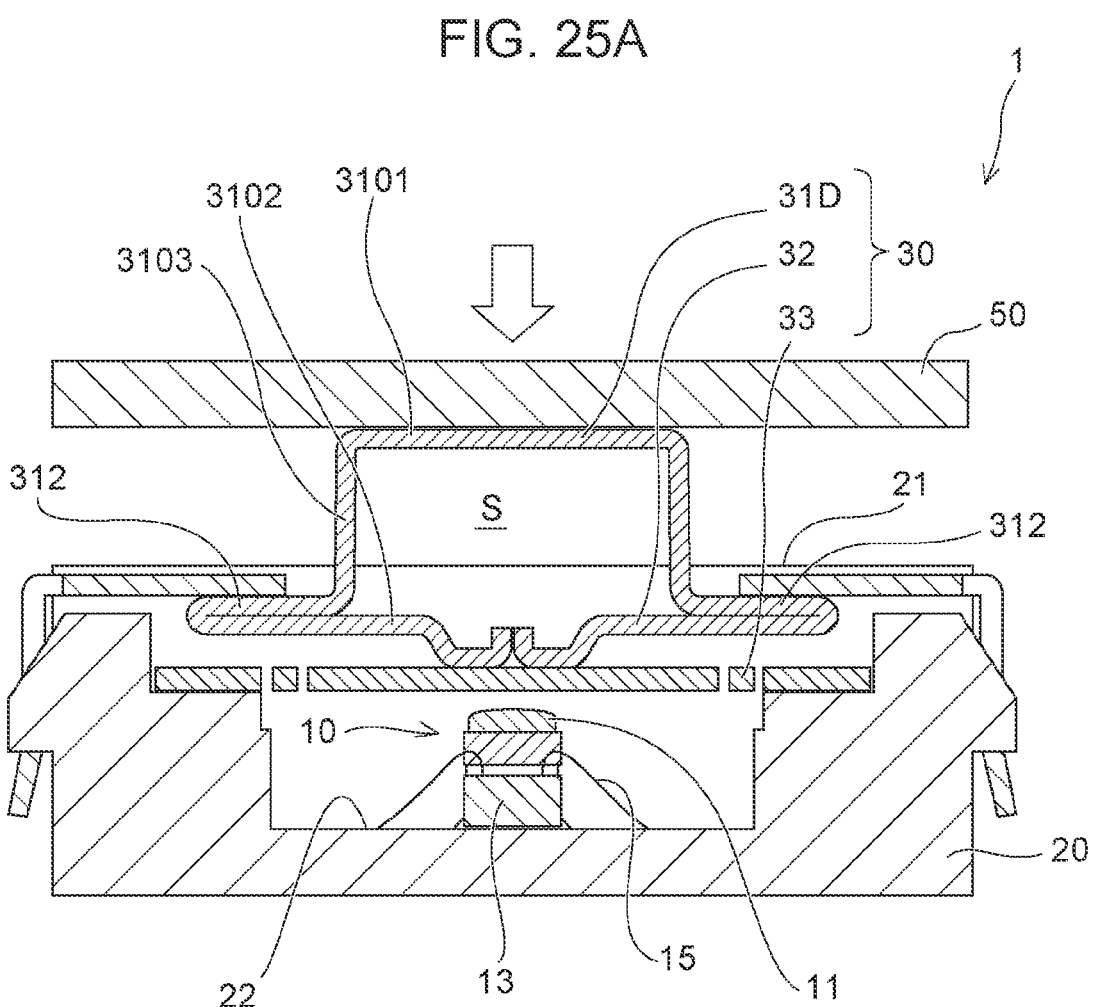
Figure 25A:
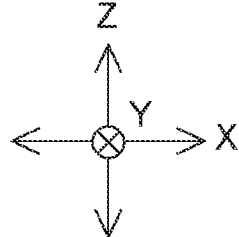
Figure 25B:
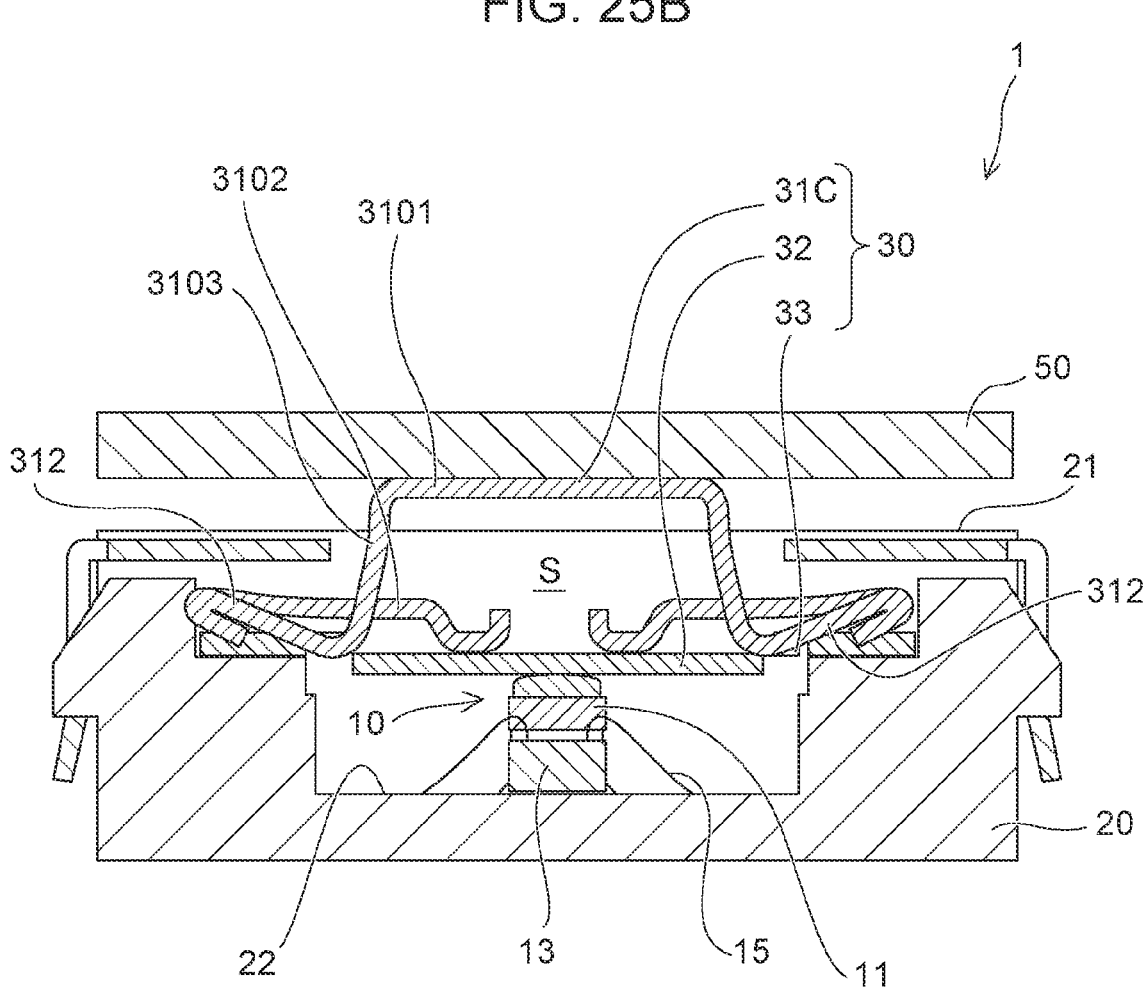
Figure 25B:
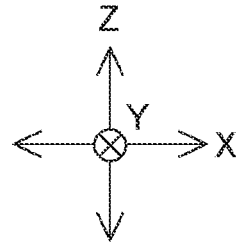
Figure 26A:
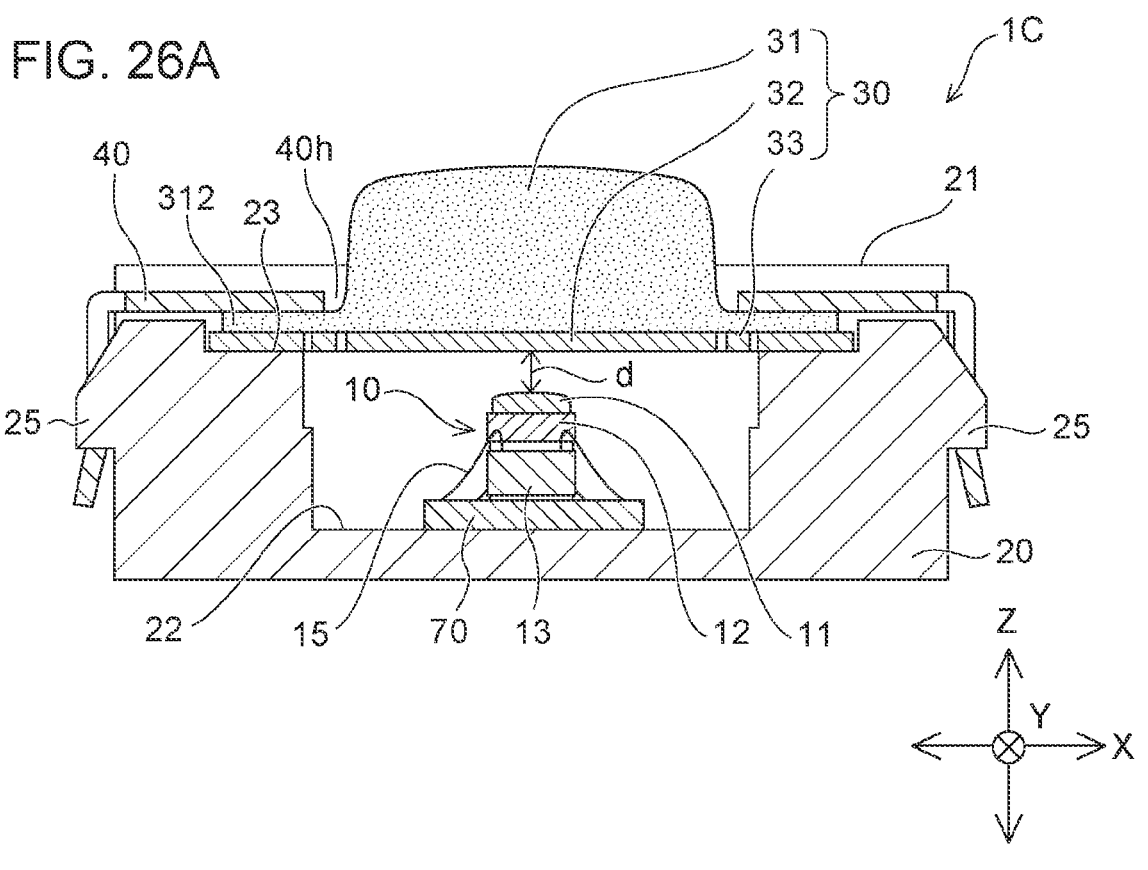
Figure 26B:
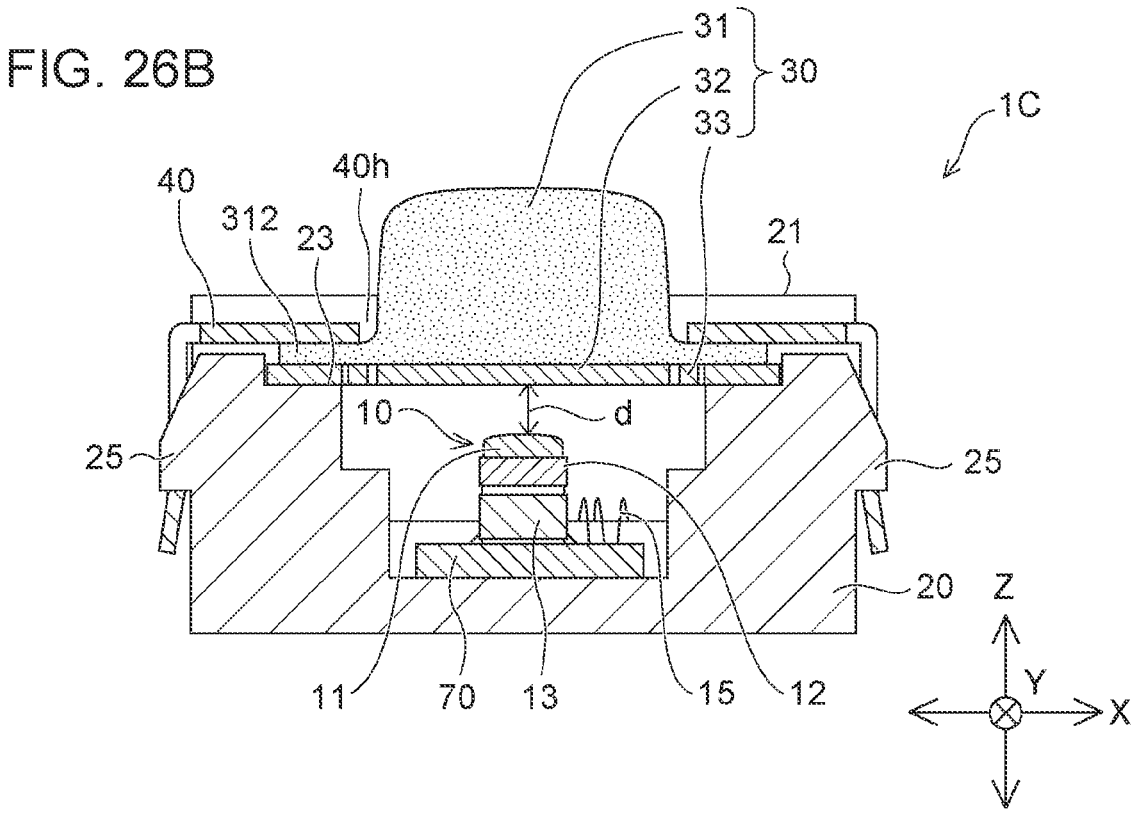
Figure 27:
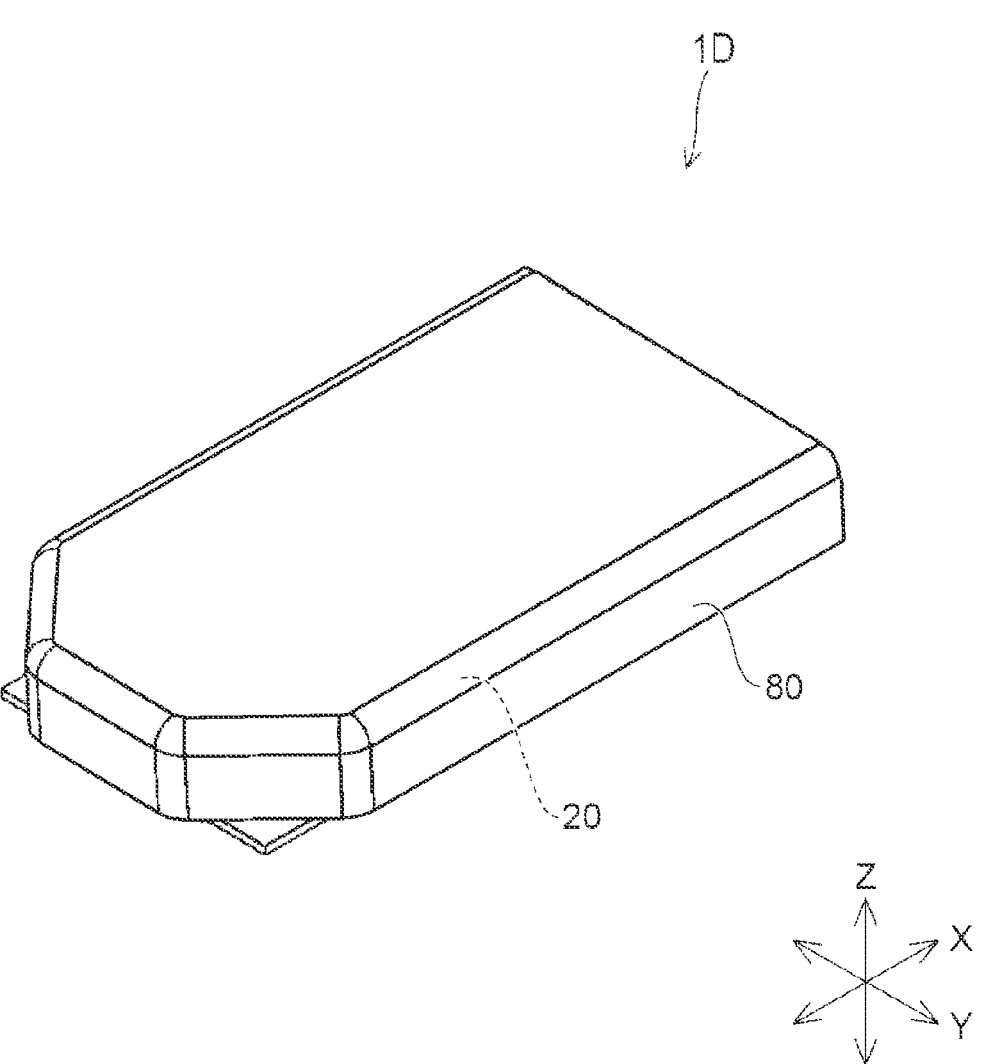
Figure 28:
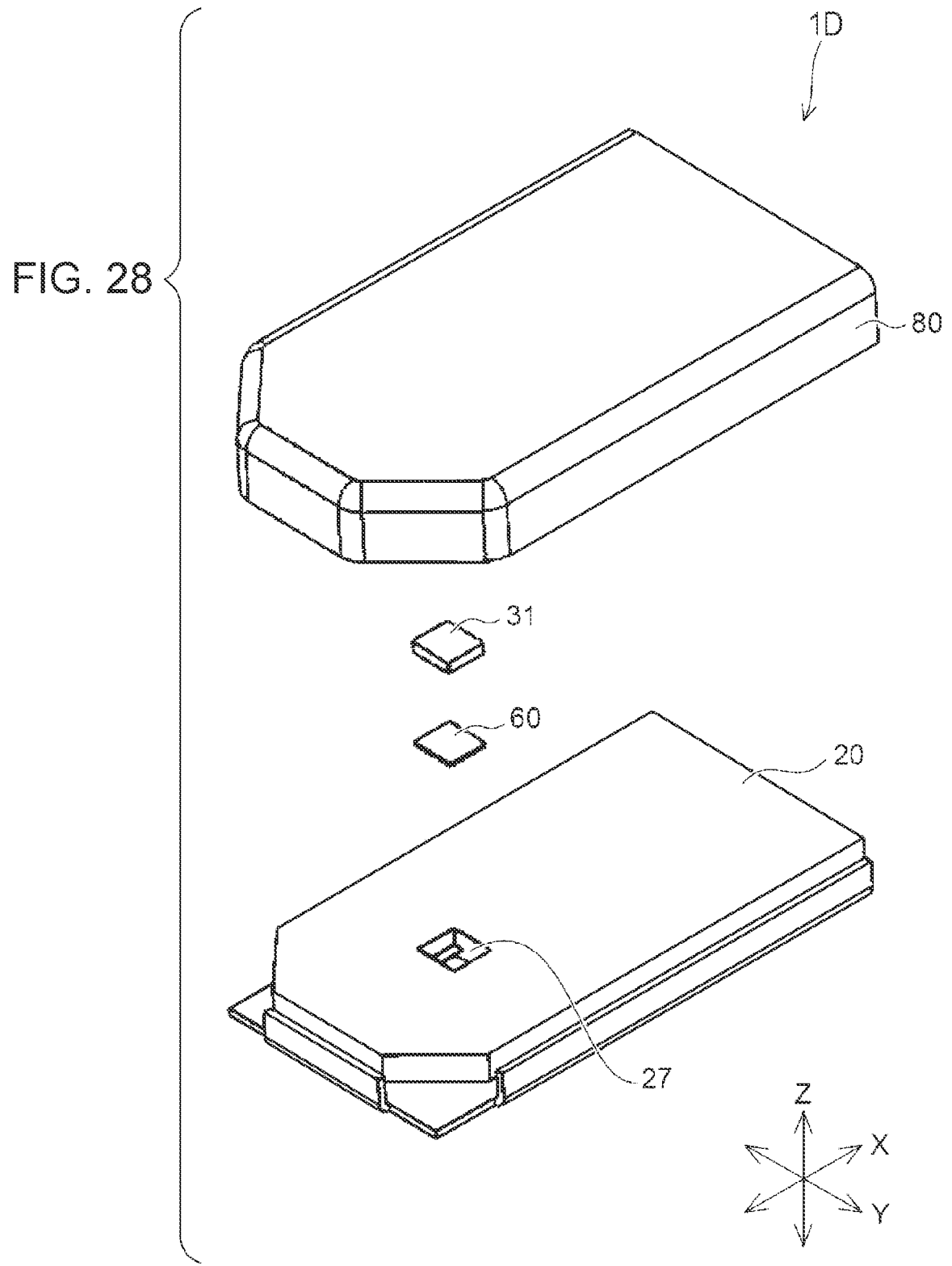
Figure 29:
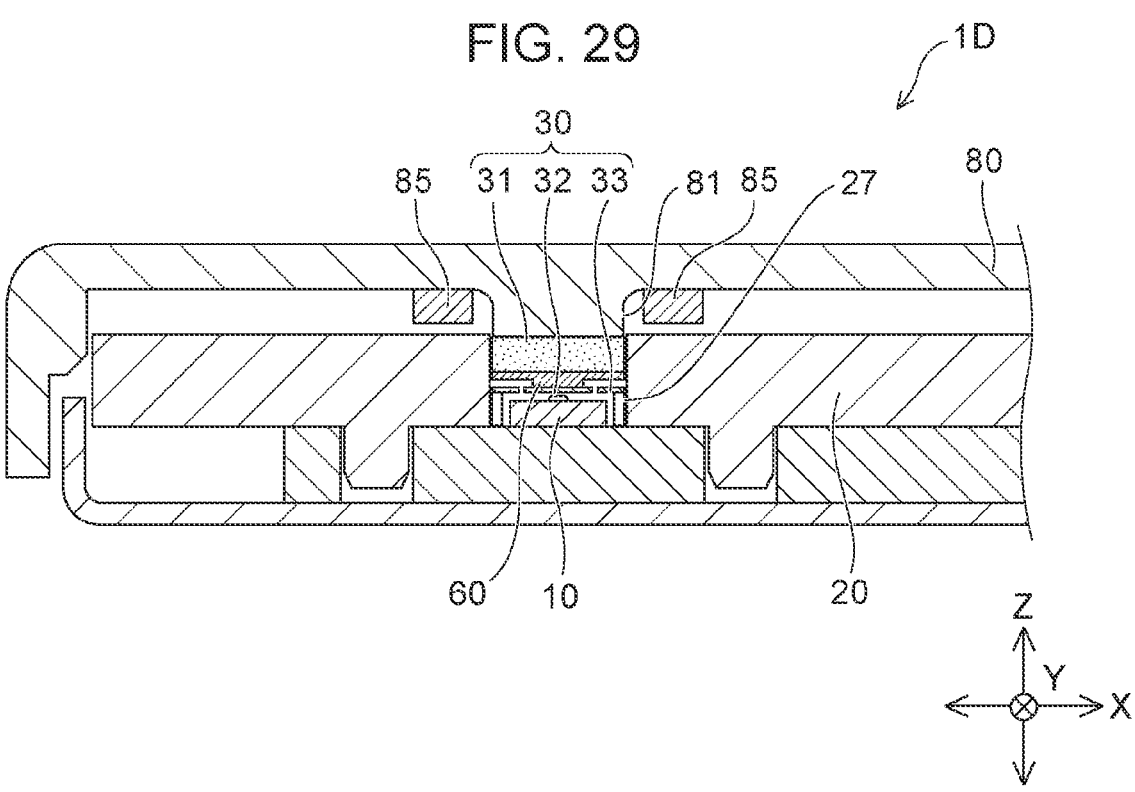
Figure 30:
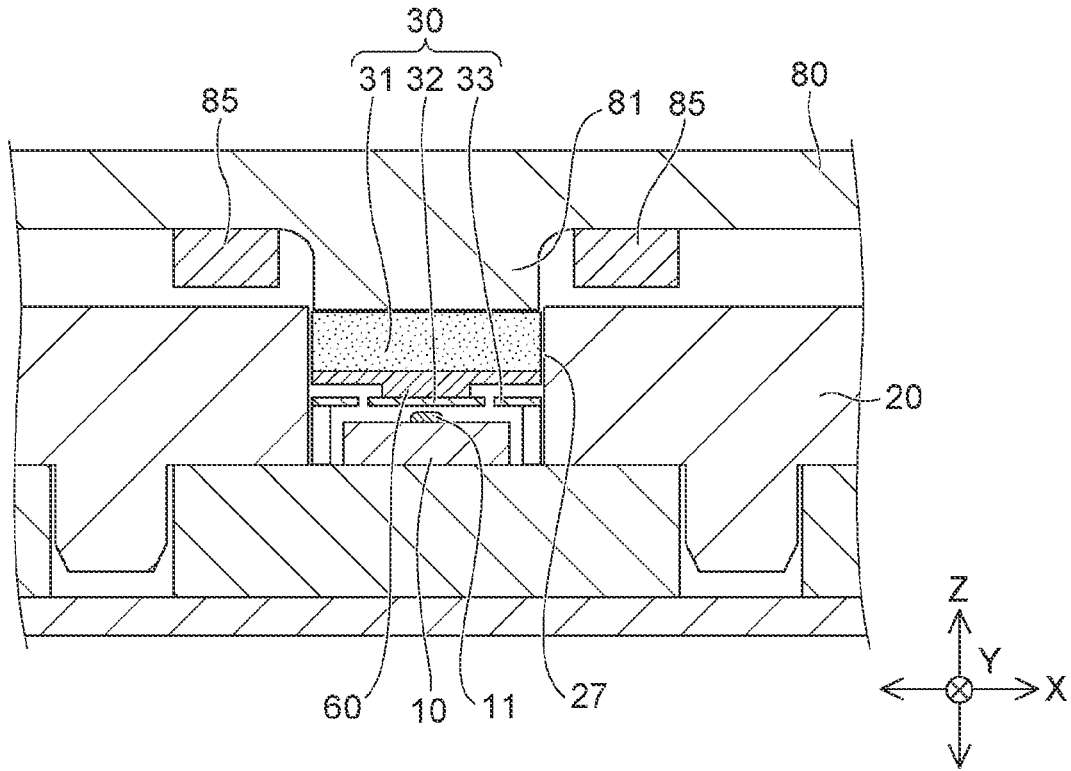

FIG. 22 is a cross-sectional view of the load sensing apparatus including another example (4) of the elastic member;

FIG. 23 is a cross-sectional view of another example (4) of the elastic member;

FIG. 24A is a cross-sectional view of a load sensing apparatus including another example (4) of the elastic member illustrating the operation thereof;

FIG. 24B is a cross-sectional view of the load sensing apparatus including another example (4) of the elastic member illustrating the operation thereof;

FIG. 25A is a cross-sectional view of a load sensing apparatus including an elastic member of a comparable example illustrating the operation thereof;

FIG. 25B is a cross-sectional view of the load sensing apparatus including the elastic member of the comparable example illustrating the operation thereof;

FIG. 26A is a cross-sectional view of a load sensing apparatus including an integrated circuit;

FIG. 26B is a cross-sectional view of the load sensing apparatus including the integrated circuit;

FIG. 27 is a perspective view of an example of a load sensing apparatus including a cover;

FIG. 28 is an exploded perspective view of an example of the load sensing apparatus including the cover;

FIG. 29 is a cross-sectional view of an example of the load sensing apparatus including the cover; and FIG. 30 is an enlarged cross-sectional view of an example of the load sensing apparatus including the cover.

DESCRIPTION OF THE PREFERRED EMBODIMENTS

Embodiments of the present invention will be described in detail hereinbelow with reference to the accompanying drawings. In the following description, like components are denoted by like reference signs, and descriptions of components once described are omitted as appropriate.

<Configuration of Load Sensing Apparatus>

Figure 1A:
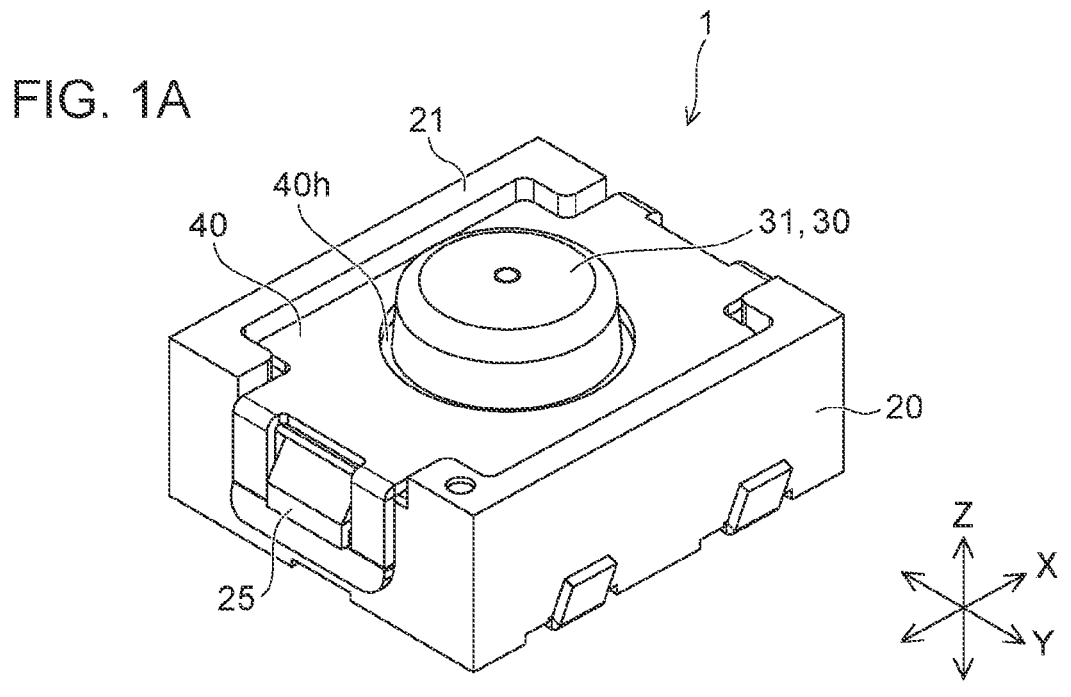
FIG. 1A is a perspective view of a load sensing apparatus according to an embodiment illustrating the configuration thereof.
Figure 1B:
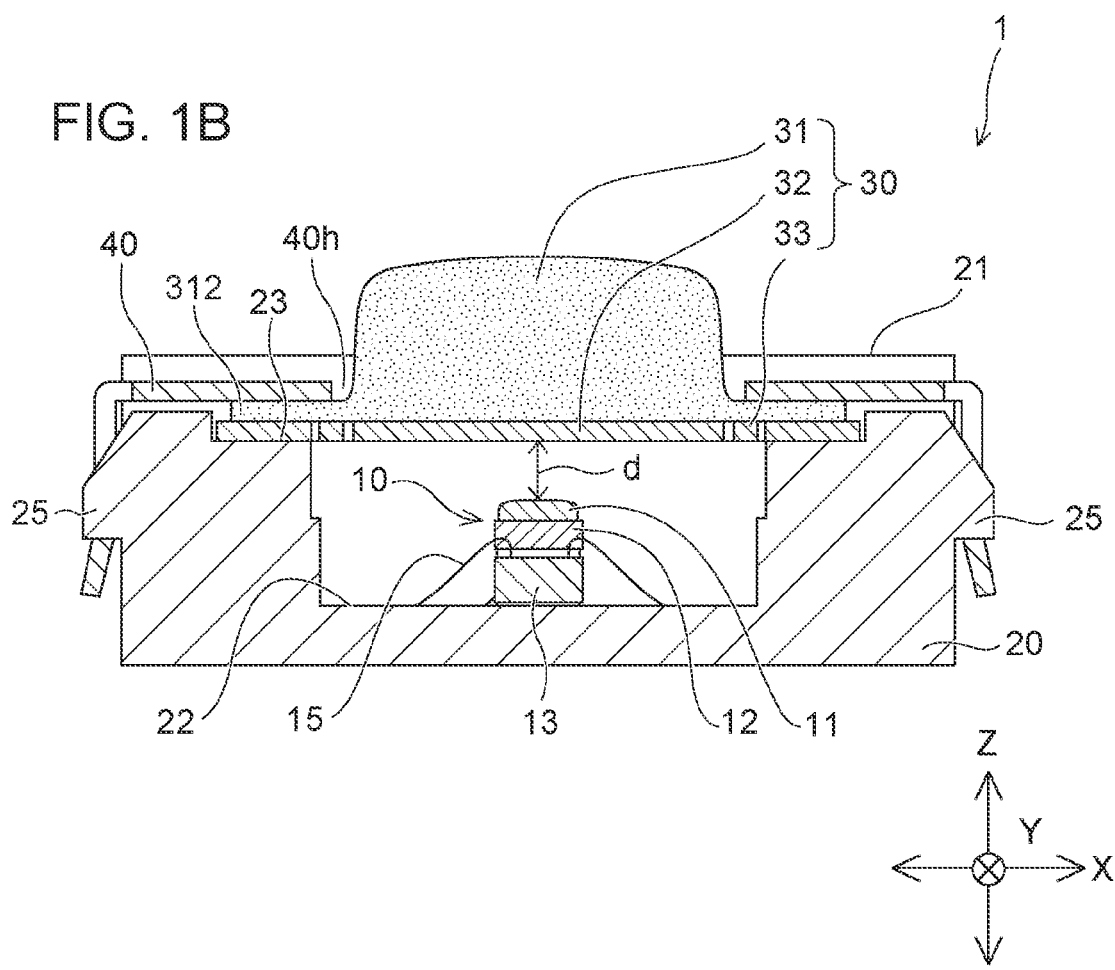
FIG. 1B is a cross-sectional view of the load sensing apparatus illustrating the configuration thereof.
Figure 2:
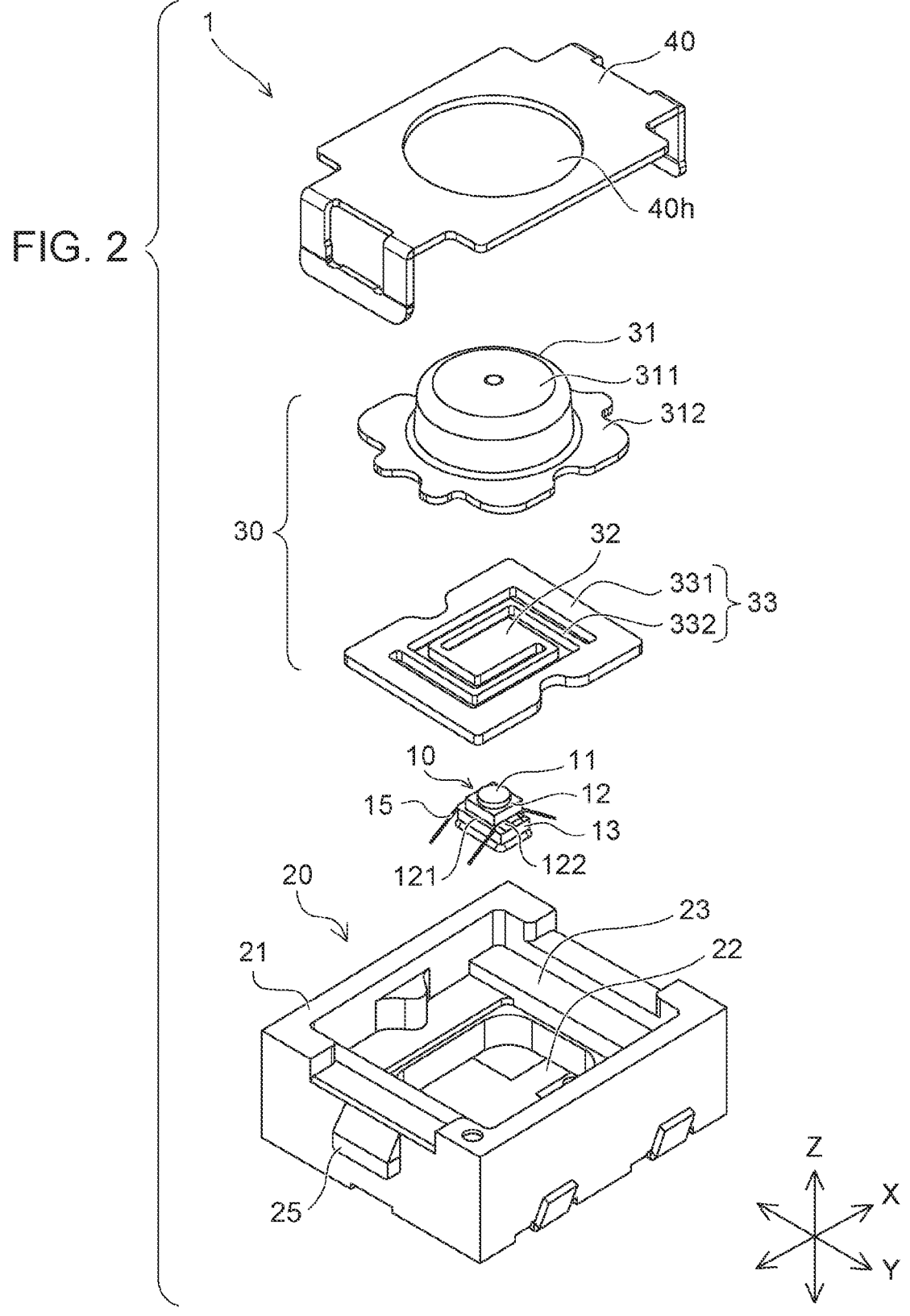
FIG. 2 is an exploded perspective view of the load sensing apparatus according to this embodiment.
Figure 3:
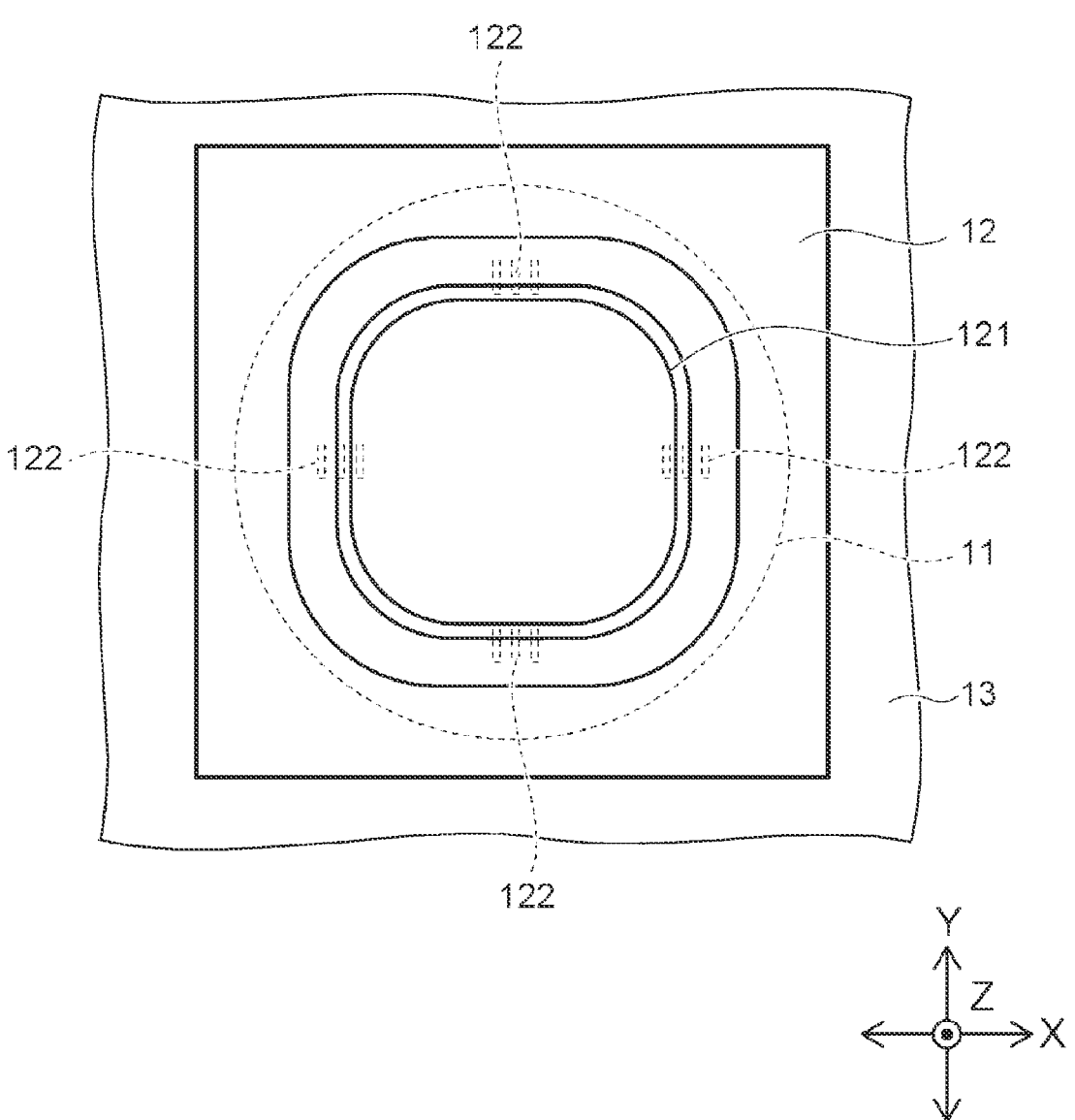
FIG. 3 is a plan view of a displacement portion of a load sensing element.

FIGS. 1A and 1B are diagrams illustrating the configuration of a load sensing apparatus according to an embodiment. FIG. 1A is a perspective view of the load sensing apparatus. FIG. 1B is a cross-sectional view of the load sensing apparatus. FIG. 2 is an exploded perspective view of the load sensing apparatus according to this embodiment. FIG. 3 is a plan view of a displacement portion of a load sensing element.

The load sensing apparatus 1 according to this embodiment is an apparatus that receives an external load and outputs a signal responsive to the load. The load sensing apparatus 1 includes a load sensing element 10, a housing 20 that houses the load sensing element 10, and a pressing member 30 supported by the housing 20. In the description of the embodiments, the direction of normal to the load sensing element 10 mount surface of the housing 20 is a Z-direction, one of the directions perpendicular to the normal direction (Z-direction) is an X-direction, and another of the directions perpendicular to the normal direction is a Y-direction.

The load sensing element 10 includes a pressure sensing portion 11 and a sensor substrate 12. The pressure sensing portion 11 is a portion protruding, for example, in a columnar shape, from the top of the sensor substrate 12 to receive an external load. The pressure sensing portion 11 is made of a silicon compound or silicon (the same material as that of the sensor substrate 12).

The sensor substrate 12 includes a displacement portion 121 that is displaced by the load received by the pressure sensing portion 11 and a plurality of piezoresistive elements 122 that electrically detects the amount of displacement of the displacement portion 121. The sensor substrate 12 is joined to the top of a base substrate 13 and is connected to the housing 20 via the base substrate 13. The displacement portion 121 is a portion that is displaced by the load received by the pressure sensing portion 11 and is disposed on the opposite surface of the sensor substrate 12 from the pressure sensing portion 11.

The piezoresistive elements 122 are elements that electrically detect the amount of displacement of the displacement portion 121. The plurality of piezoresistive elements 122 is disposed on the displacement portion 121. The plurality of piezoresistive elements 122 is disposed along the periphery of the displacement portion 121 in such a manner that the adjacent elements are 90° out of phase with each other (mutually orthogonal positional relationship). When the displacement portion 121 is displaced by the load received by the pressure sensing portion 11, the electrical resistance of the plurality of piezoresistive elements 122 changes according to the amount of displacement, and the midpoint electrical potential of a bridge circuit constituted by the plurality of piezoresistive elements 122 changes. This midpoint electrical potential is the sensor output.

The housing 20 has, for example, a box shape and includes an edge 21 and a housing space 22 which is a central recess. The edge 21 is the uppermost surface of the housing 20 and serves as a stopper when receiving an external load.

The housing space 22 houses the load sensing element 10. The housing space 22 is provided with pads. The housed load sensing element 10 and the pads are electrically connected by bonding wires 15. The housing space 22 may have resin (not shown) embedded therein for the purpose of protection of the bonding wires 15 and so on.

A level-difference portion 23 is provided inside the edge 21 so as to enclose the housing space 22. A stiff pressing member 32 of the pressing member 30, described later, is placed on the level-difference portion 23.

The pressing member 30 includes an elastic member 31 that receives an external load, a stiff pressing portion 32 that comes into contact with the pressure sensing portion 11, and an elastic supporting portion 33 that receives the stiff pressing portion 32 in the housing 20. The elastic member 31 includes a protruding portion 311 and a flange 312. The elastic member 31 is made of rubber, for example. The protruding portion 311 is columnar, for example. The flange 312 has a surface for placing the protruding portion 311 on the stiff pressing portion 32.

The stiff pressing portion 32 is a plate-like member made of a material harder than the elastic member 31. The stiff pressing portion 32 is made of, for example, stainless steel with a thickness of about 0.2 mm. Examples material for the stiff pressing portion 32 include silicon, ceramic, glass, and aluminum. The elastic modulus of the stiff pressing portion 32 is higher than the elastic modulus of the elastic member 31, and preferably 60 GPa or more.

The elastic supporting portion 33 includes a frame 331 placed on the level-difference portion 23 of the housing 20 and an arm 332 that connects the frame 331 and the stiff pressing portion 32 together. Since the stiff pressing portion 32 is supported by the elastic supporting portion 33, the stiff pressing portion 32 is positioned above the housing space 22 with the elastic supporting portion 33 therebetween.

The arm 332 is a plate spring portion that acts as a plate spring. The stiff pressing portion 32 is supported using the elastic deformation of the arm 332 with a predetermined spring constant. This spring constant is adjusted by means of the material, width, thickness, length, and shape of the arm 332. Because the arm 332 has a plate spring shape and is disposed symmetrically about the stiff pressing portion 32, the load from the elastic member 31 can easily be transmitted to the pressure sensing portion 11 directly below.

The elasticity of the pressing member 30 allows the load when the elastic member 31 is pressed to be transmitted from the elastic member 31 to the pressure sensing portion 11 of the load sensing element 10 via the elastic supporting portion 33 and the stiff pressing portion 32. In this case, the stiff pressing portion 32, which comes into contact with the pressure sensing portion 11, is made of, for example, a highly stiff material (metal or silicon). This reduces or eliminates runout of the load, thereby enhancing the detection sensitivity.

The configuration of the load sensing element 10 that produces an output using a bridge circuit with the plurality of piezoresistive elements 122 requires to receive the load with the protruding pressure sensing portion 11 to deform the displacement portion 121 efficiently. For this reason, if the stiffness of a member that comes into contact with the pressure sensing portion 11 is low, the load to be transmitted from the pressing member 30 to the pressure sensing portion 11 cannot be efficiently transmitted to the pressure sensing portion 11. In this embodiment, the pressure sensing portion 11 is pressed using the stiff pressing portion 32. This allows reducing or eliminating the runout of an external load, thereby transmitting the load to the pressure sensing portion 11 efficiently.

<Assembly of Load Sensing Apparatus>

In the above configuration, the load sensing element 10 is housed in the housing space 22 of the housing 20, and the load sensing element 10 and the pads in the housing space 22 are connected together using the bonding wires 15. The elastic supporting portion 33 of the pressing member 30 is placed on the level-difference portion 23 of the housing space 22, and the elastic member 31 is placed on the stiff pressing portion 32.

In this state, the housing 20 is covered with the frame 40. The frame 40 is fixed by engaging with hooks 25 provided on the sides of the housing 20. The frame 40 has a hole 40h at the center. When the frame 40 is placed over the housing 20, the protruding portion 311 protrudes upward through the hole 40h. The elastic member 31 is held at the flange 312 by the frame 40. Thus, the pressing member 30 is fixed to the housing 20.

In the load sensing apparatus 1 assembled in this manner, a gap d is formed between the stiff pressing portion 32 and the pressure sensing portion 11 in a state in which no load is applied to the pressing member 30. In other words, a surface of the stiff pressing portion 32 adjacent to the pressure sensing portion 11 is not in contact with the pressure sensing portion 11. The presence of the gap d between the stiff pressing portion 32 and the pressure sensing portion 11 allows providing tolerances in assembly.

In other words, if the stiff pressing portion 32 and the pressure sensing portion 11 are in contact or close enough to come into contact, the stiff pressing portion 32 and the pressure sensing portion 11 may collide with each other because of the dimensional errors of the components or misalignment in assembly. Collision of a high-stiffness member, like the stiff pressing portion 32, with the pressure sensing portion 11, may exert adverse influences on the load sensing element 10. Providing the gap d between the stiff pressing portion 32 and the pressure sensing portion 11 as in this embodiment allows collision at assembly to be positively prevented, thereby protecting the load sensing element 10.

<Operation of Load Sensing Apparatus>

Figure 4A:
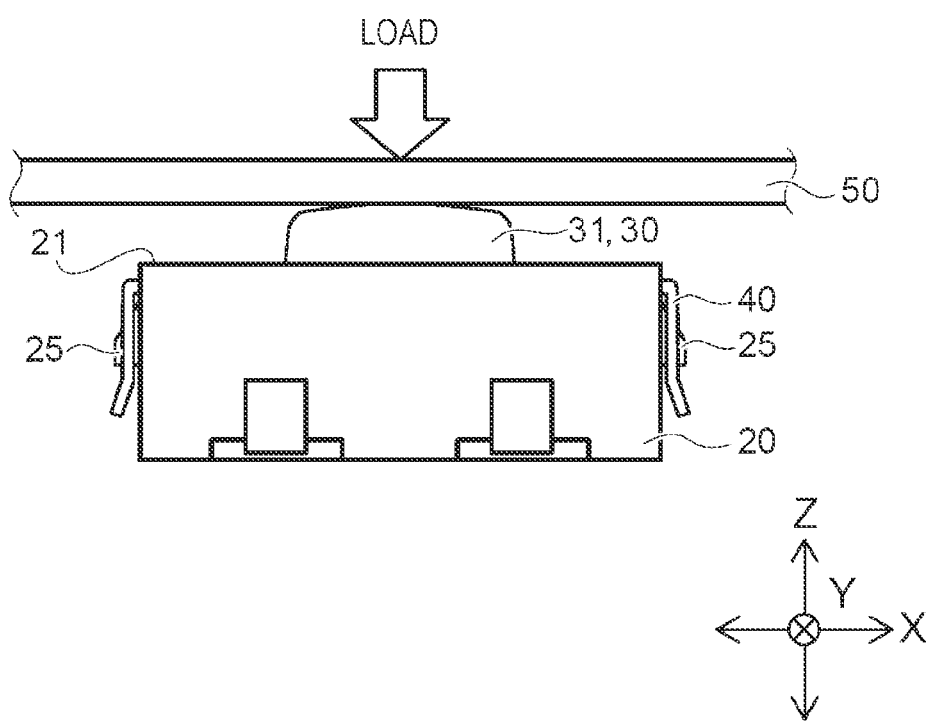
FIG. 4A is a diagram illustrating the operation of the load sensing apparatus according to this embodiment.
Figure 4B:
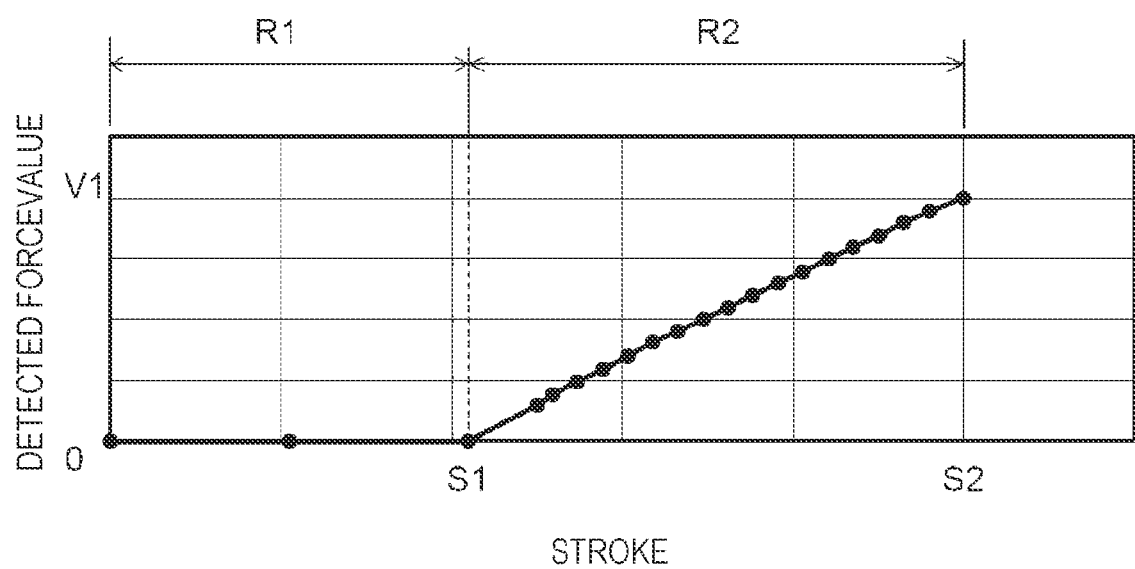
FIG. 4B is a diagram illustrating the operation of the load sensing apparatus according to this embodiment.

FIGS. 4A and 4B are diagrams illustrating the operation of the load sensing apparatus according to this embodiment. FIG. 4A illustrates a state in which the load sensing apparatus 1 is subjected to a load. FIG. 4B illustrate an example of the output of the load sensing element. The horizontal axis of FIG. 4B represents the stroke of a plate 50 in the Z-direction, and the vertical axis represents the output values (relative values).

As shown in FIG. 4A, the elastic member 31 of the pressing member 30 of the load sensing apparatus 1 is subjected to a load via the plate 50. When a load is applied in the Z-direction from the plate 50 to the elastic member 31, the stiff pressing portion 32 supported using the spring action of the elastic supporting portion 33 is pushed in the Z-direction.

Since the gap d is provided between the stiff pressing portion 32 and the pressure sensing portion 11 of the load sensing element 10, the pressure sensing portion 11 is subjected to no load until the stiff pressing portion 32 comes into contact with the pressure sensing portion 11.

Accordingly, no output is produced during the period after the load sensing apparatus 1 is subjected to a load to a predetermined stroke S1, as shown in FIG. 4B. This region is referred to as a prestroke region R1. In the prestroke region R1, the pressing member 30 makes a stroke, but the load is not transmitted to the pressure sensing portion 11, so that the output value does not increase during the period after the elastic supporting portion 33 is elastically deformed under the load until the stiff pressing portion 32 comes into contact with the pressure sensing portion 11. The length of the prestroke region R1 can be set using the gap d.

Next, when the load is applied across the prestroke region R1, the output value increases according to the stroke. This region is referred to as a force receiving region R2. In the force receiving region R2, the stiff pressing portion 32 is in contact with the pressure sensing portion 11, so that the load is transmitted from the elastic member 31 to the pressure sensing portion 11 via the stiff pressing portion 32. The output value from the load sensing element 10 increases substantially in proportion to the stroke (load) because of the stiffness of the stiff pressing portion 32 that is in contact with the pressure sensing portion 11. The output value increases to V1 according to the stroke.

The force receiving region R2 continues until the edge 21 of the housing 20 functions as a stopper. In other words, when the pressing member 30 is pushed to bring the plate 50 into contact with the edge 21 of the housing 20, the pushing stops. Thus, the stroke of the pressing member 30 stops at S2, so that the output value does not increase, and therefore an overload on the load sensing element 10 is prevented.

Figure 5A:
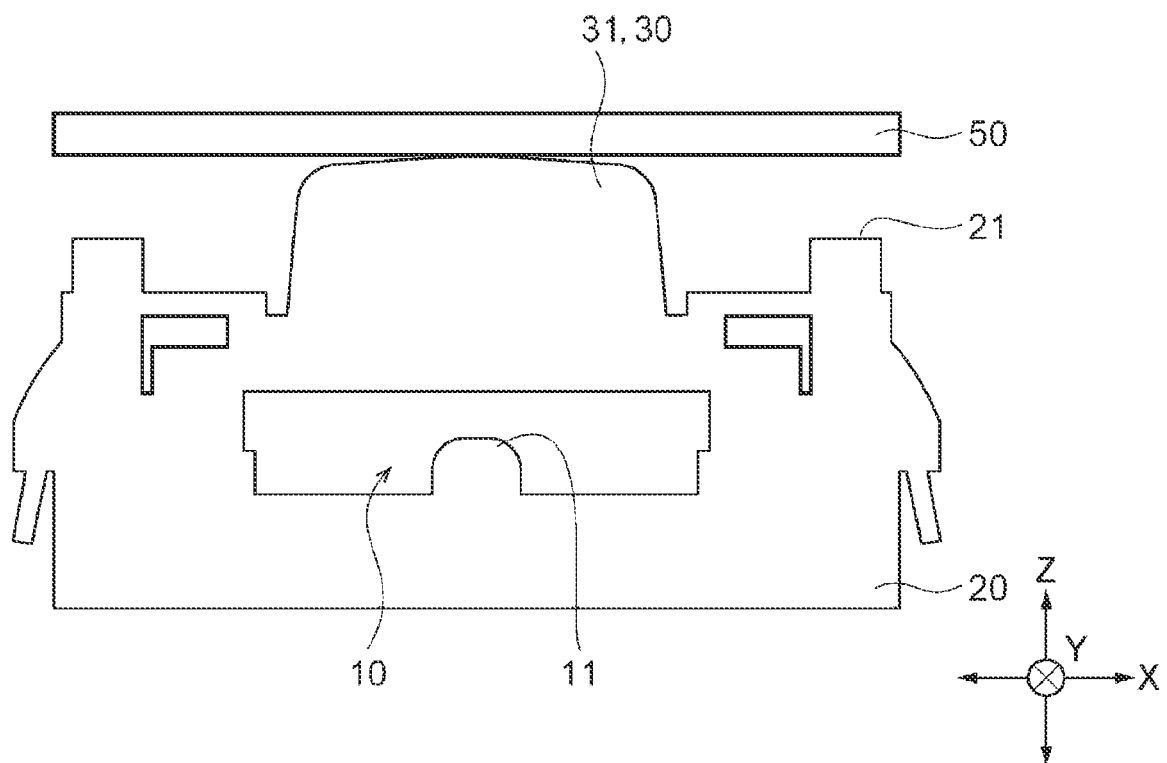
FIG. 5A is a stress distribution chart when a load is applied to the load sensing apparatus according to this embodiment.
Figure 5B:
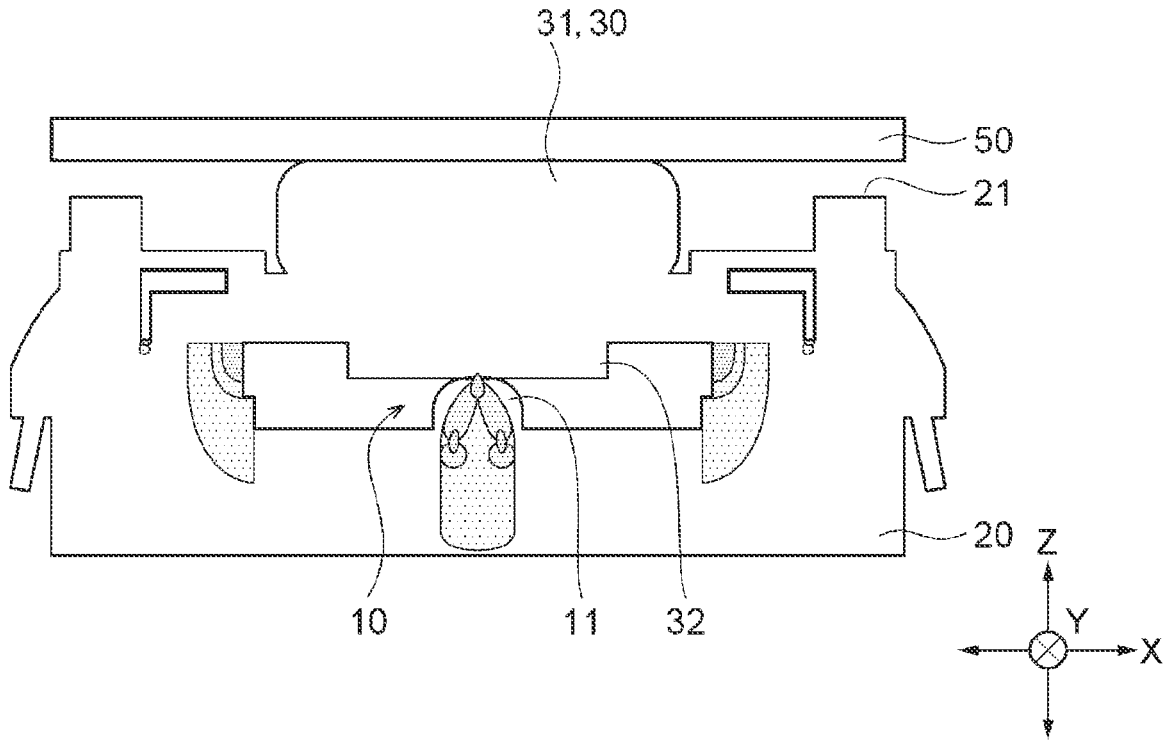
FIG. 5B is a stress distribution chart when a load is applied to the load sensing apparatus according to this embodiment.
Figure 5C:
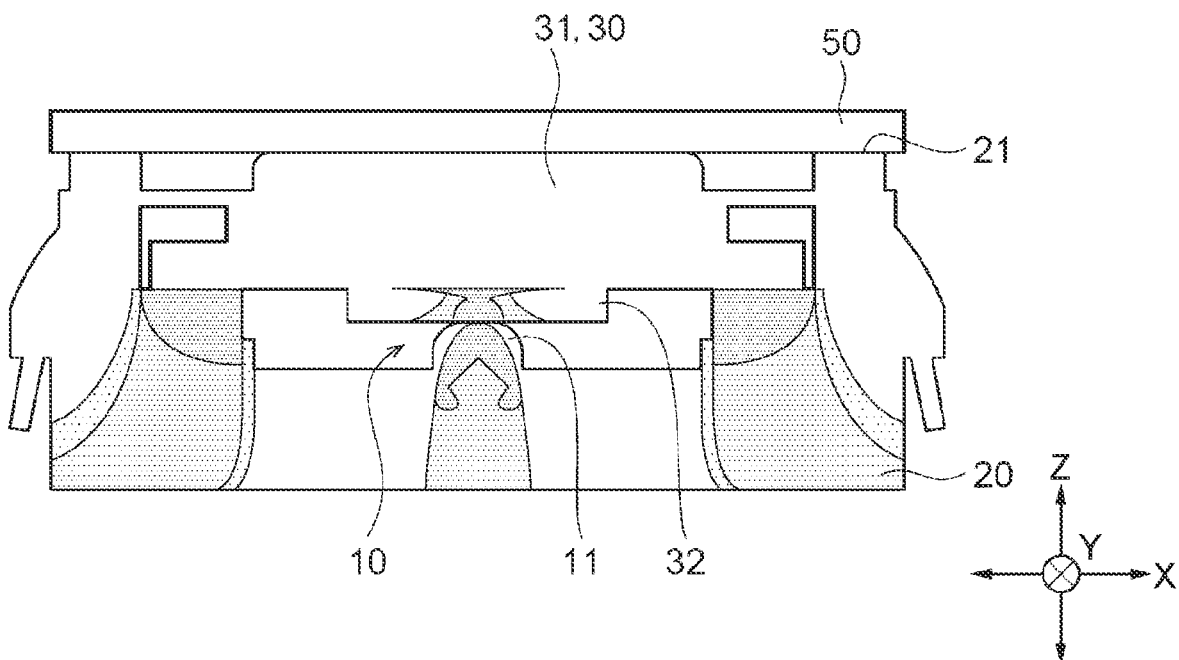
FIG. 5C is a stress distribution chart when a load is applied to the load sensing apparatus according to this embodiment.

FIGS. 5A to 5C are stress distribution charts when a load is applied to the load sensing apparatus according to this embodiment. FIG. 5A shows a state in which no load is applied (the state at stroke 0 in FIG. 4B). In this state, since the arm 332 of the elastic supporting portion 33, which supports the stiff pressing portion 32 between the elastic member 31 and the pressure sensing portion 11, is not deformed, the stiff pressing portion 32 is hidden by the frame 331.

FIG. 5B shows a stress distribution in a state in which the pressing member 30 is pushed in the Z-direction by application of a load to bring the stiff pressing portion 32 into contact with the pressure sensing portion 11 (the state at stroke S1 in FIG. 4B). The load from the plate 50 is transmitted to the stiff pressing portion 32 via the elastic member 31. This causes the stiff pressing portion 32 to move toward the pressure sensing portion 11 in the Z-direction into contact therewith while being supported by the arm 332 of the elastic supporting portion 33.

FIG. 5C shows a stress distribution in a state in which the plate 50 is in contact with the edge 21 of the housing 20 (the state at stroke S2 in FIG. 4B). The change in stress distribution shows that the load applied from the plate 50 is effectively transmitted from the stiff pressing portion 32 to the load sensing element 10 via the pressure sensing portion 11.

Even if the plate 50 is diagonally proximate to (in partial-contact with) the load sensing apparatus 1 for any reason (assembly variation), deformation of the elastic member 31 that is in direct contact with the plate 50 allows stabilizing the state of contact between the plate 50 and the elastic member 31. The elastic member 31 subjected to a load displaces the stiff pressing portion 32 in the Z-direction toward the pressure sensing portion 11 while deforming the arm 332. Thus, the elastic member 31 is for stabilizing the contact between the pressing member 30 and the plate 50, and the stiff pressing portion 32 is for achieving proper contact between the pressing member 30 and the load sensing element 10.

EXAMPLES

Comparison of the hardness of pressing portions that come into contact with the pressure sensing portion 11 will be described.

Figure 6A:
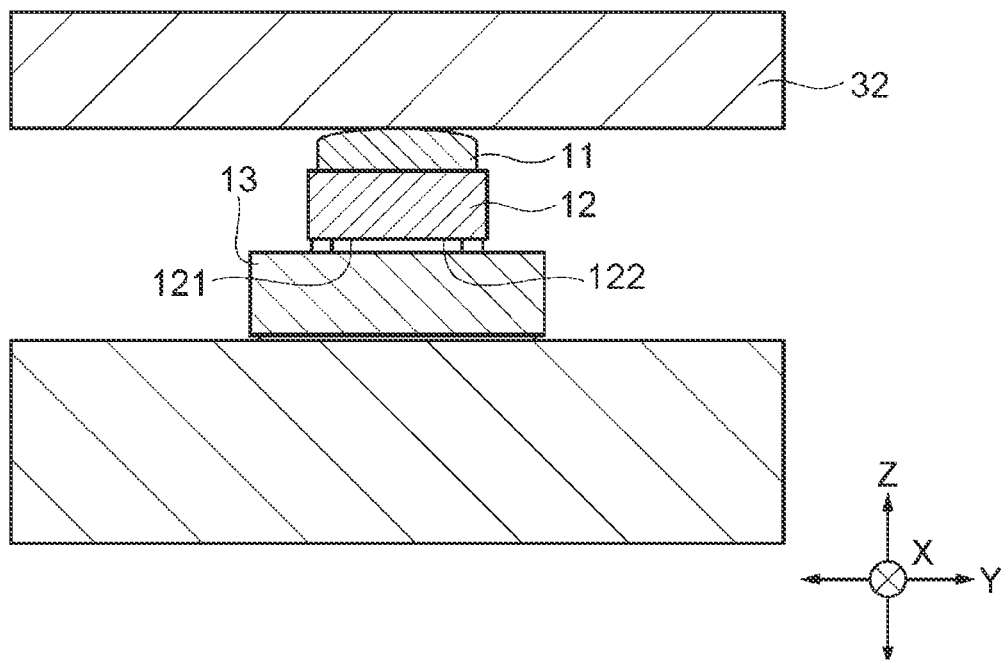
FIG. 6A is a diagram illustrating a pressing state in the case where a stiff pressing portion is used.
Figure 6B:
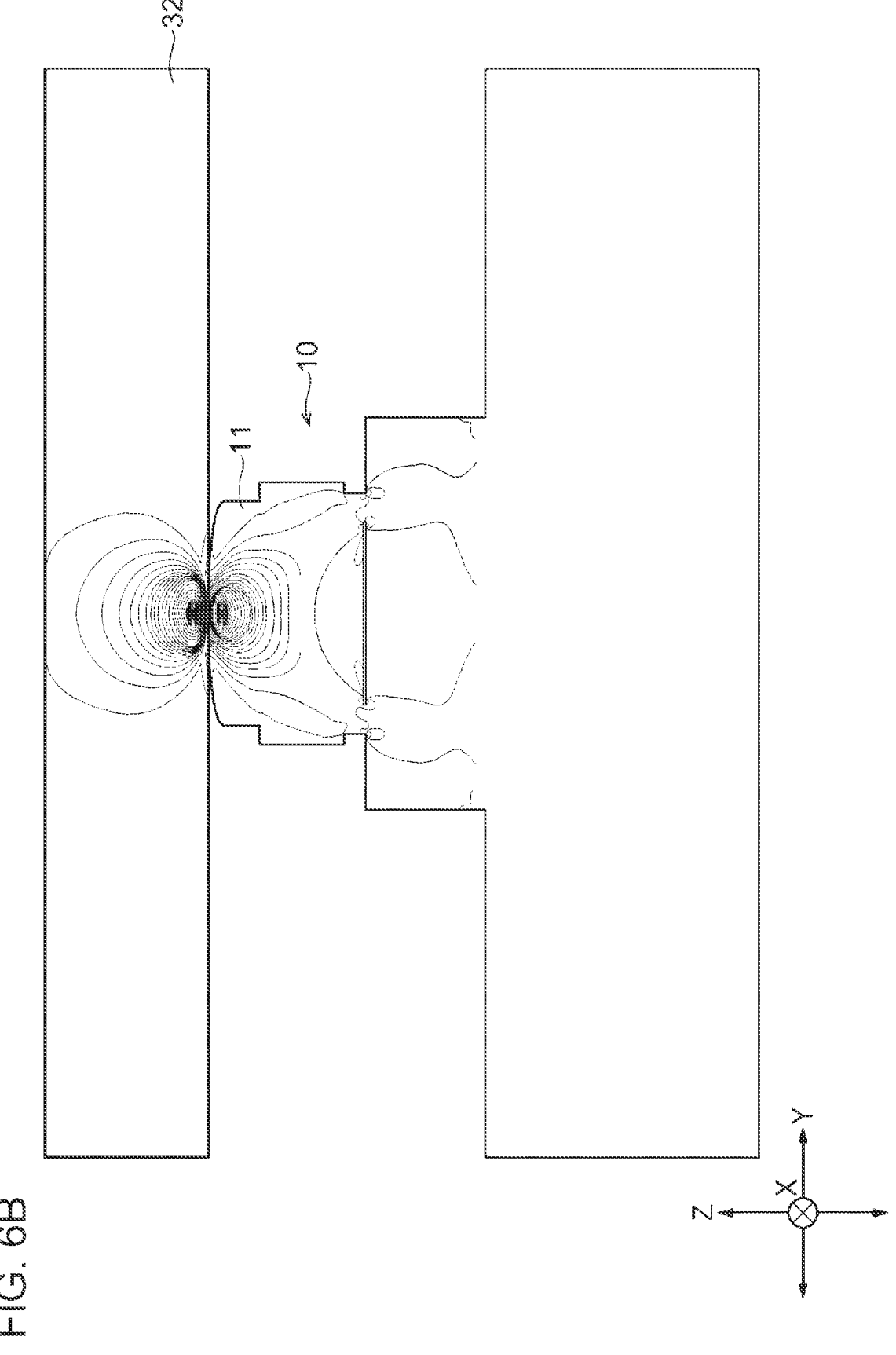
FIG. 6B is a diagram illustrating a pressing state in the case where a stiff pressing portion is used.

FIGS. 6A and 6B are diagrams illustrating a pressing state in the case where the stiff pressing portion 32 comes into contact with the pressure sensing portion 11 in an example of the present invention. FIG. 6A is a schematic cross-sectional view of the stiff pressing portion 32 and the pressure sensing portion 11 in contact with each other. FIG. 6B is a stress distribution chart in the case where a load is applied from the stiff pressing portion 32 to the pressure sensing portion 11.

Figure 7A:
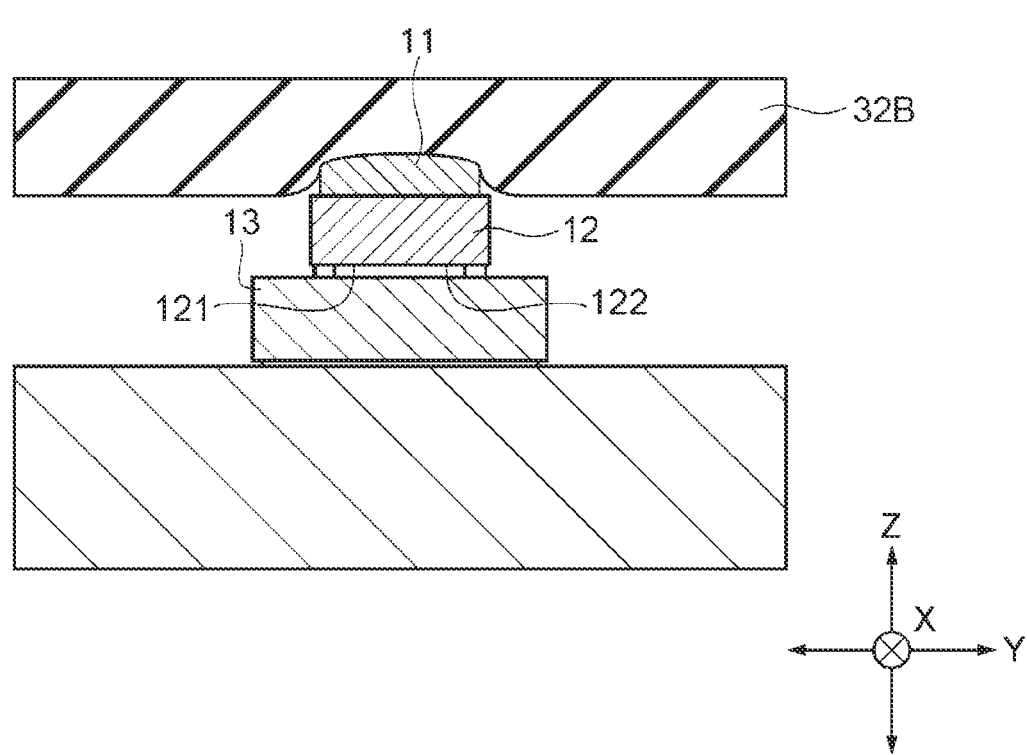
FIG. 7A is a diagram illustrating a pressing state in the case where an elastic pressing portion is used.
Figure 7B:
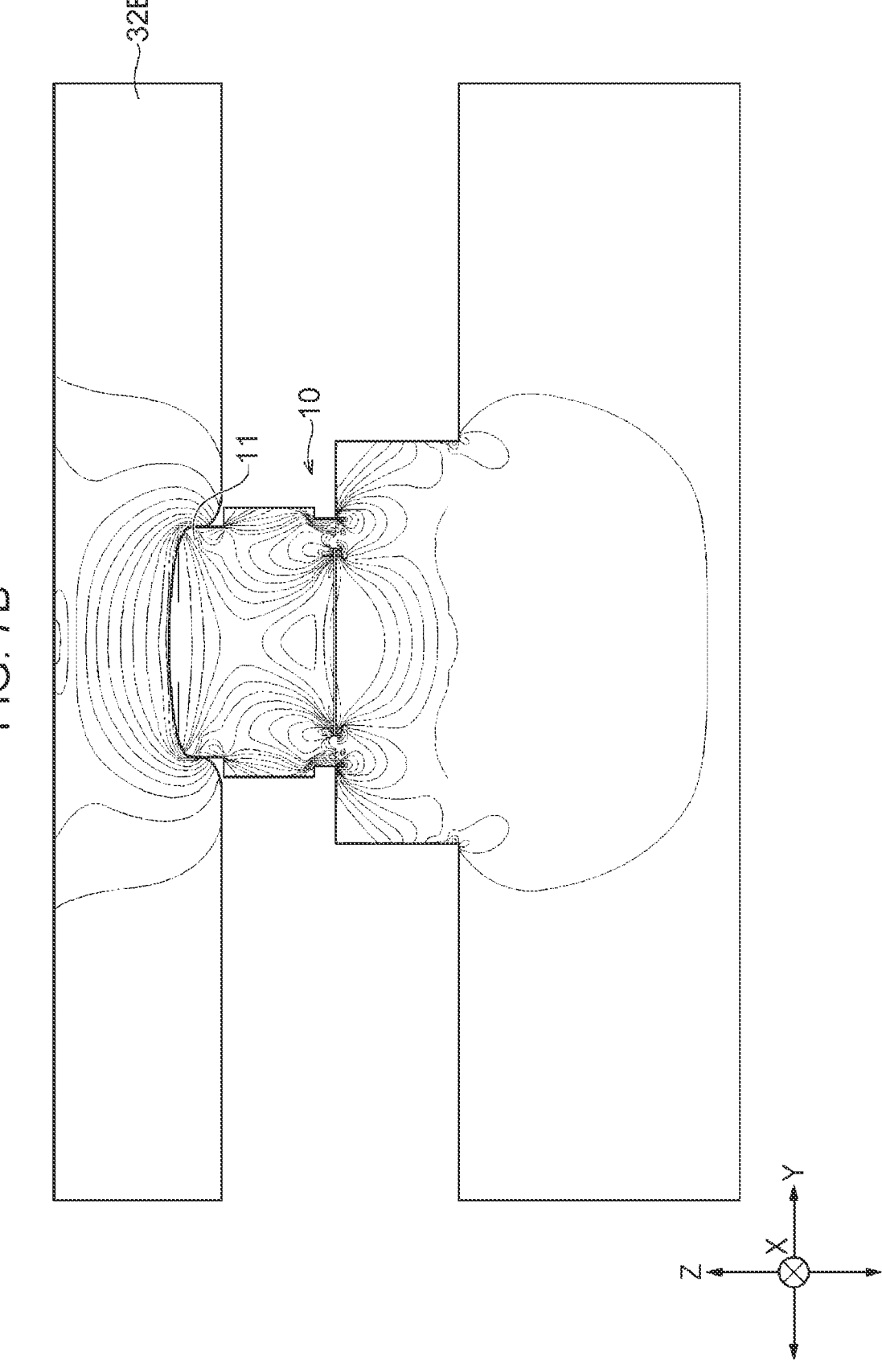
FIG. 7B is a diagram illustrating a pressing state in the case where an elastic pressing portion is used.

FIGS. 7A and 7B are diagrams illustrating a pressing state in the case where an elastic pressing portion 32B with a low elastic modulus, in place of the stiff pressing portion 32, comes into contact with the pressure sensing portion 11 in a comparable example. FIG. 7A is a schematic cross-sectional view of the stiff pressing portion 32B and the pressure sensing portion 11 in contact with each other. FIG. 7B is a stress distribution chart in the case where a load is applied from the stiff pressing portion 32B to the pressure sensing portion 11.

Figure 8A:
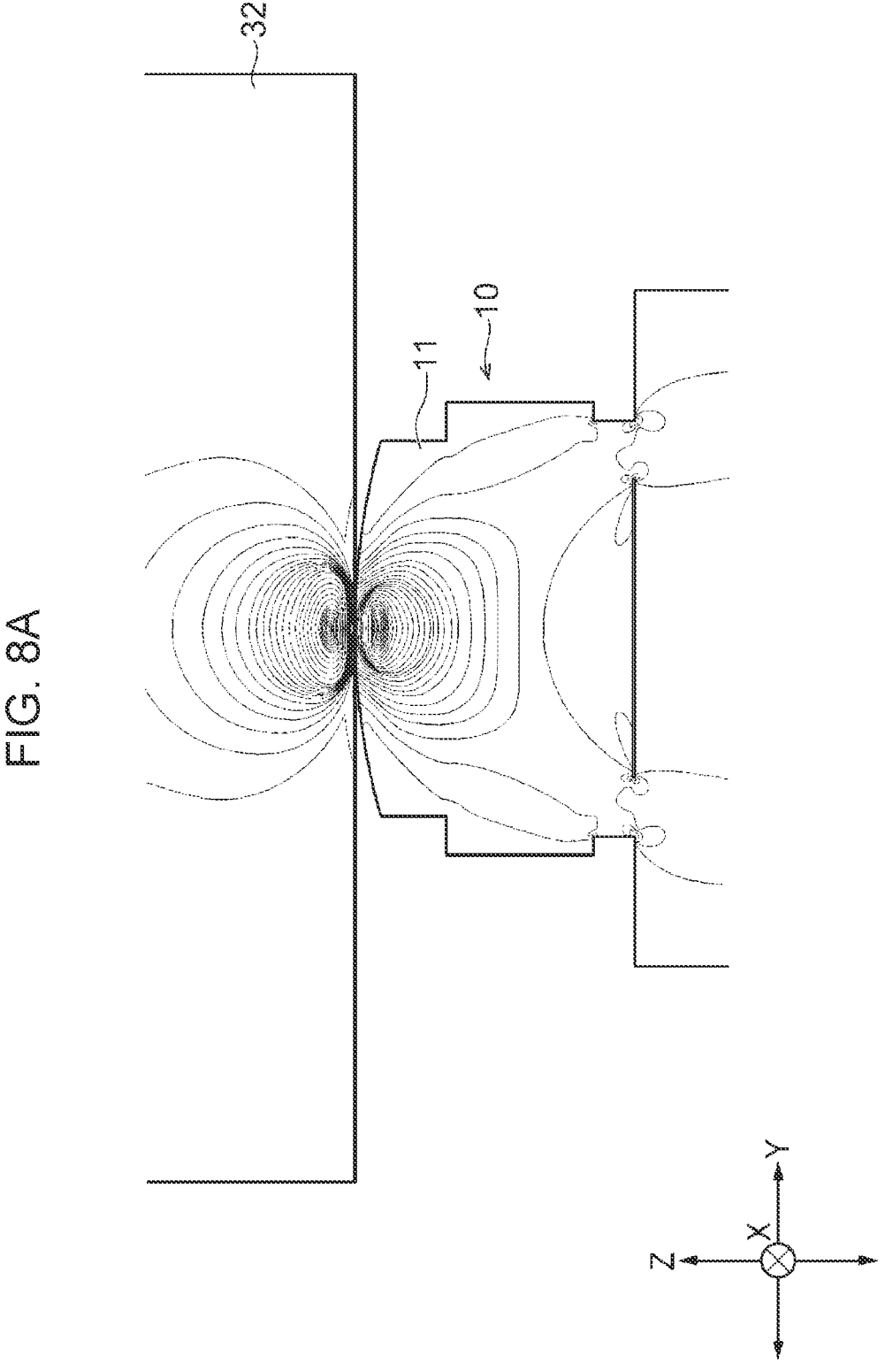
FIG. 8A is an enlarged stress distribution chart of a pressure sensing portion and a pressing portion.

FIGS. 8A and 8B are enlarged stress distribution charts of the pressure sensing portion and the pressing portions. FIG. 8A is an enlarged stress distribution chart of the contact between the stiff pressing portion 32 and the pressure sensing portion 11 shown in FIG. 6B. FIG. 8B is an enlarged stress distribution chart of the contact between the elastic pressing portion 32B and the pressure sensing portion 11 shown in FIG. 7B.

The stiff pressing portion 32 shown in FIGS. 6A and 6B and FIG. 8A was made of stainless steel (SUS304). The elastic pressing portion 32B shown in FIGS. 7A and 7B and FIG. 8B was made of rubber (a hardness of 70, measured using a durometer Type A). Both of them applied a load of 6 N to the pressure sensing portion 11.

The example showed that using the stiff pressing portion 32 caused the load to be intensively transmitted toward the sensor substrate around the point of contact with the pressure sensing portion 11. In contrast, using the elastic pressing portion 32B caused the pressure sensing portion 11 to bite into the elastic pressing portion 32B, causing the load to disperse. Accordingly, the stiff pressing portion 32 should have stiffness to the extent that the surface of contact with the pressure sensing portion 11 is within the pressure sensing surface of the pressure sensing portion 11. The area of the contact surface can be obtained using Hertzian contact theory.

Figure 9:
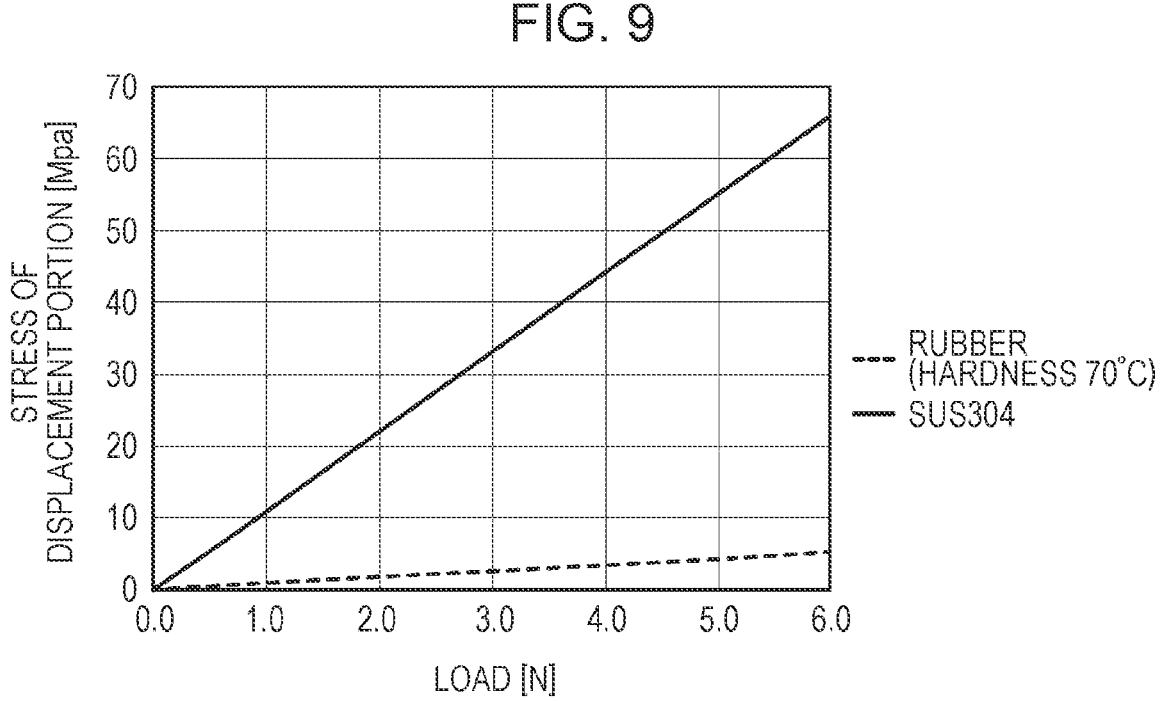
FIG. 9 is a graph showing the stress of the displacement portion against a load.

FIG. 9 is a graph showing the stress of the displacement portion against a load. When the elastic pressing portion 32B was used, the load dispersed and therefore could not be efficiently transmitted from the pressure sensing portion 11 to the sensor substrate 12, and as a result, the stress against the load, transmitted to the displacement portion 121 of the sensor substrate 12, was not increased. In contrast, when the stiff pressing portion 32 was used, the load could be efficiently transmitted to the sensor substrate, and as a result, the stress against the load, transmitted to the displacement portion 121 of the sensor substrate 12, could be increased. The change in the stress of the displacement portion 121 against the load shown in FIG. 9 is equivalent to sensitivity. Accordingly, using the stiff pressing portion 32 provides more sufficient sensitivity than using the elastic pressing portion 32B.

Figure 10:
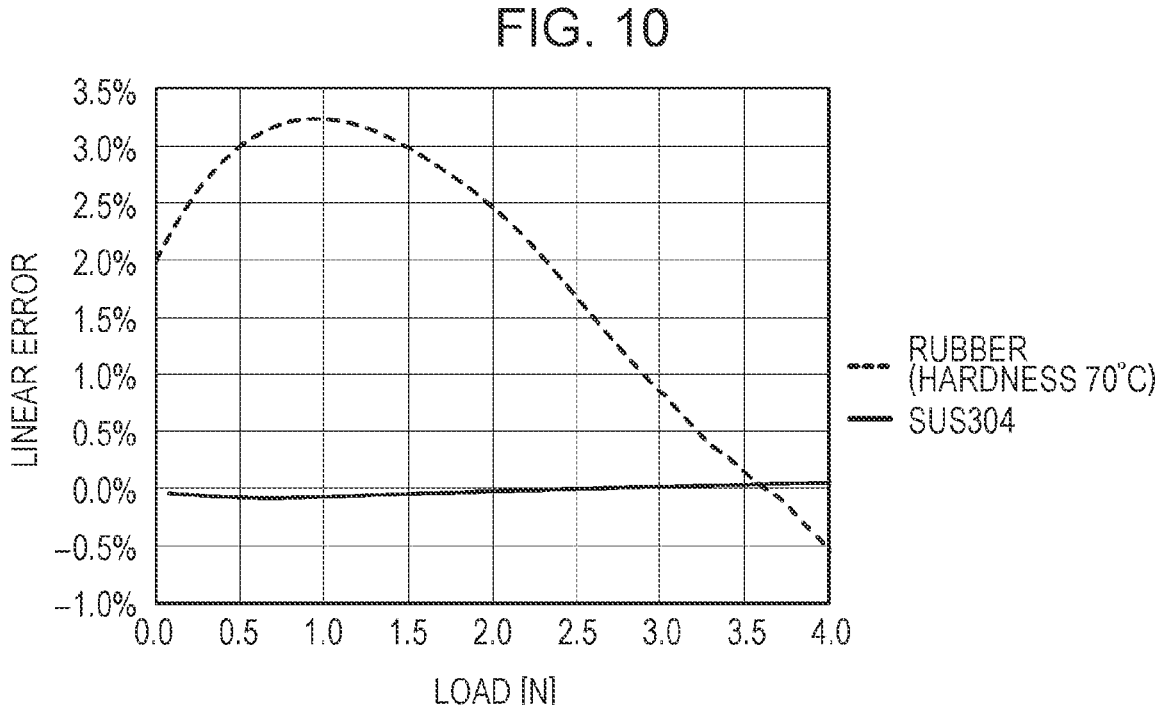
FIG. 10 is a graph showing the linear error of the output value of the load sensing element with respect to a load.

FIG. 10 is a graph showing the linear error of the output value of the load sensing element with respect to a load. When the elastic pressing portion 32B was used, the pressure sensing portion 11 bit into the elastic pressing portion 32B to 4 N, which caused the load to disperse, causing a large linear error. In contrast, when the stiff pressing portion 32 was used, the pressure sensing portion 11 did not bite into the stiff pressing portion 32, which caused almost no runout of the load. This showed that the linear error was very small.

<Another Example of Load Sensing Apparatus>

Figure 11:
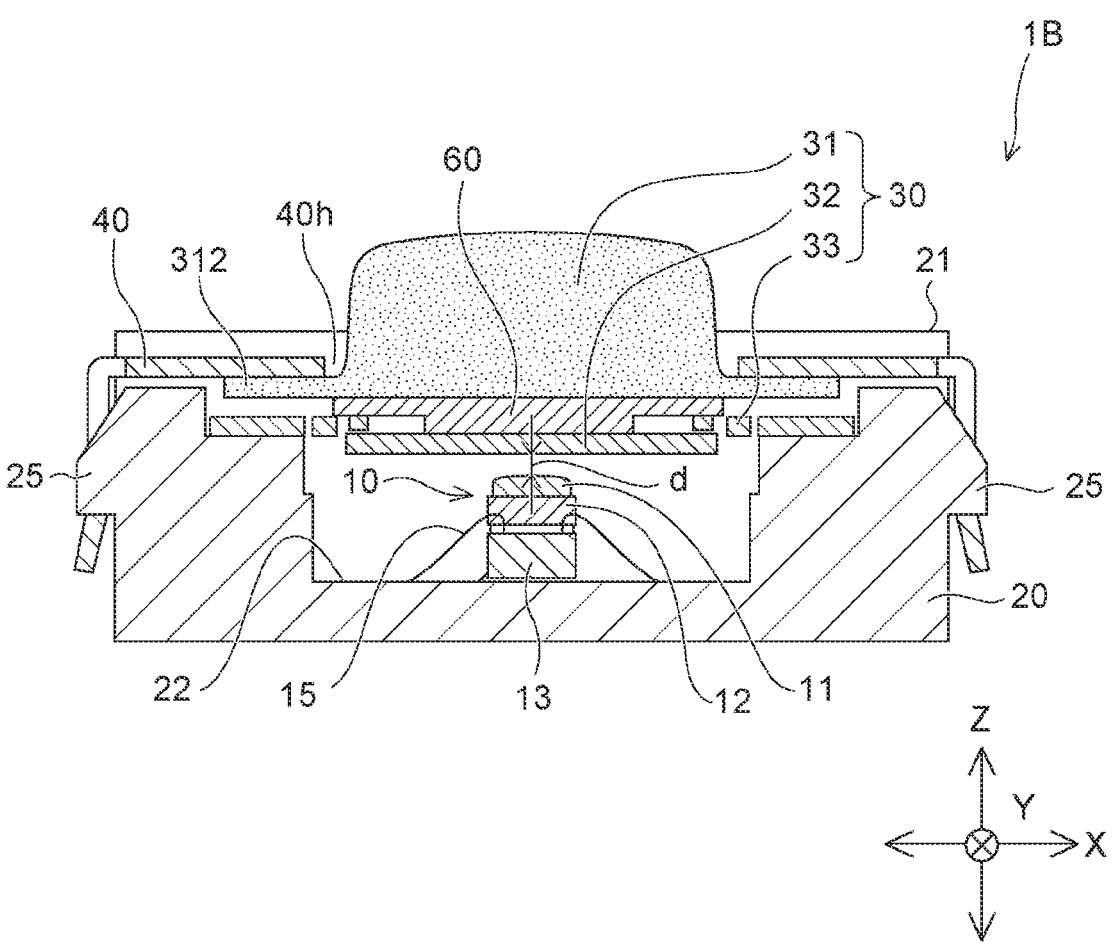
FIG. 11 is a cross-sectional view of another example of the load sensing apparatus according to this embodiment.
Figure 12:
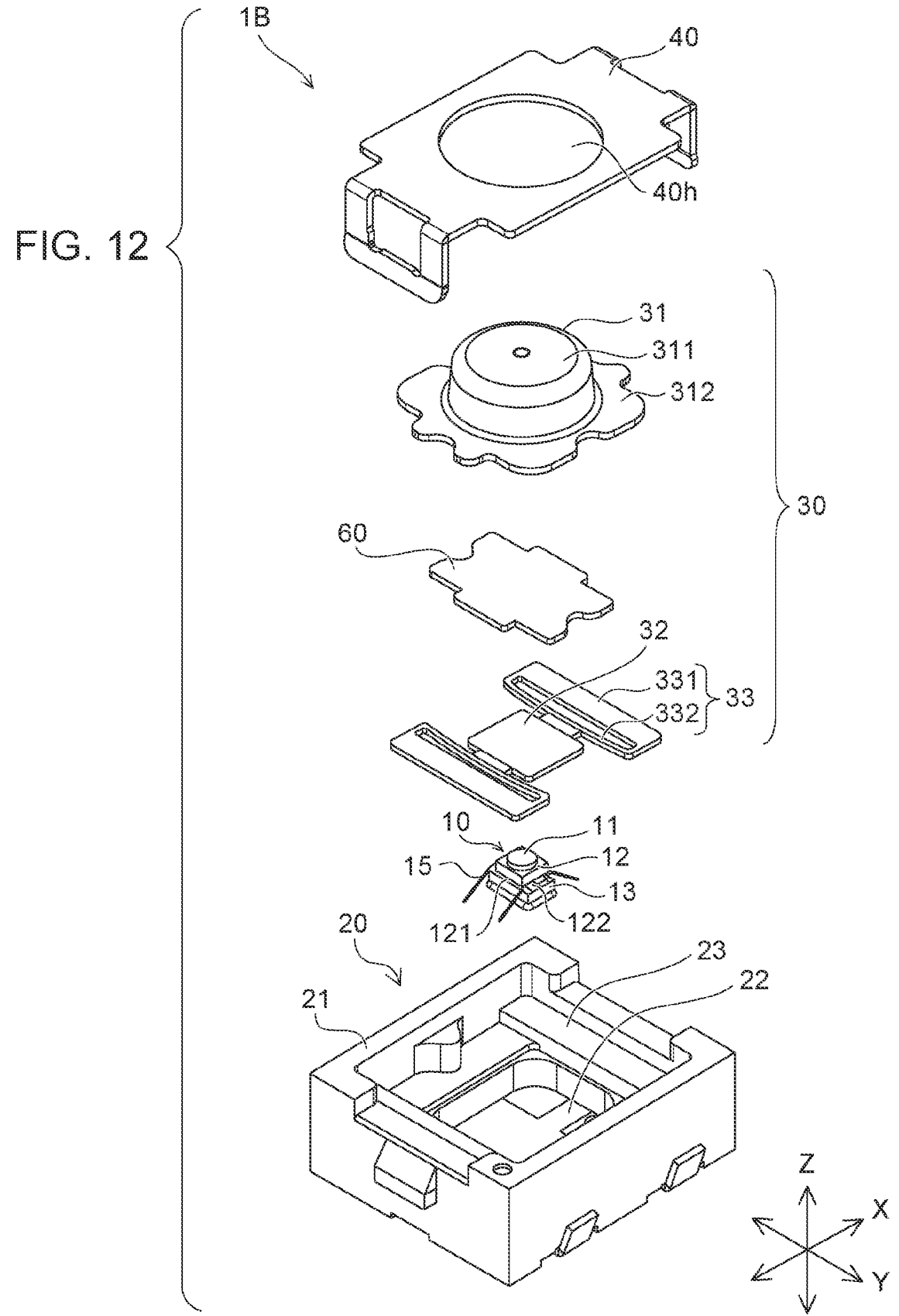
FIG. 12 is an exploded perspective view of the other example of the load sensing apparatus according to this embodiment.

FIG. 11 is a cross-sectional view of another example of the load sensing apparatus according to this embodiment. FIG. 12 is an exploded perspective view of the other example of the load sensing apparatus according to this embodiment.

As shown in FIGS. 11 and 12, a load sensing apparatus 1B of another example includes a stiff plate 60 between the elastic member 31 and the stiff pressing portion 32.

The load sensing apparatus 1 described above directly presses the stiff pressing portion 32 using the elastic member 31. However, since part (flange 312) of the elastic member 31 is in contact with the frame and the frame 331 of the elastic supporting portion 33, part of the received load disperses to cause attenuation of the force to be transmitted to the load sensing element 10.

In contrast, the load sensing apparatus 1B transmits the load received by the elastic member 31 to the stiff pressing portion 32 via the stiff plate 60. The stiff plate 60 can transmit the force to the center of the stiff pressing portion 32 without interfering with another member. This facilitates transmitting the load received by the elastic member 31 to the load sensing element 10, thereby increasing the sensitivity.

Figure 13A:
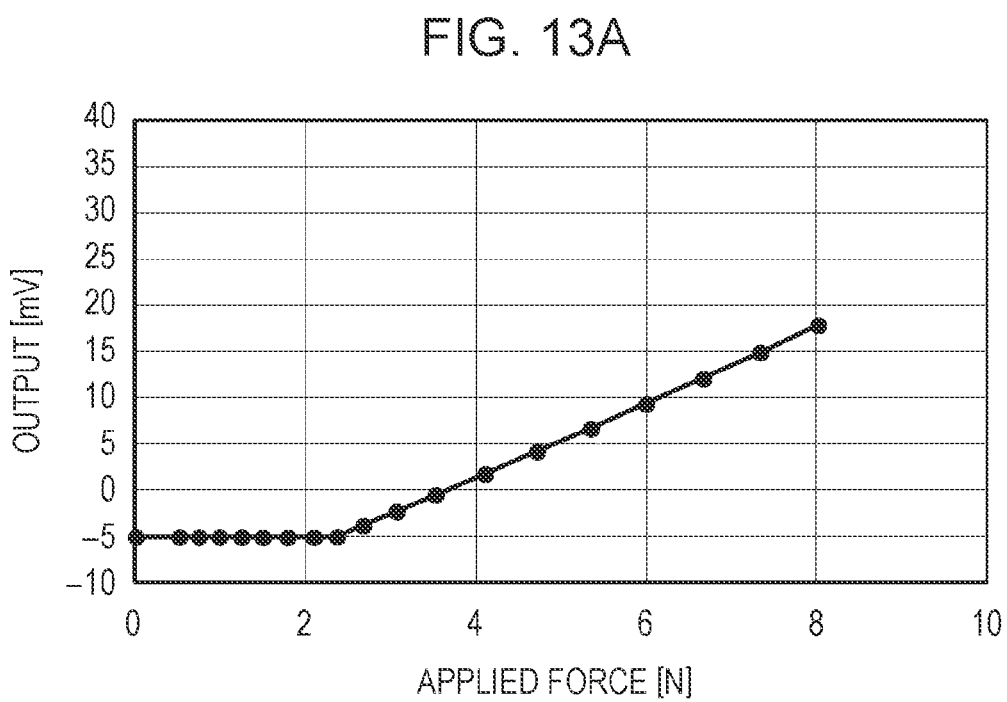
FIG. 13A is a graph showing the output characteristics of a load sensing apparatus.
Figure 13B:
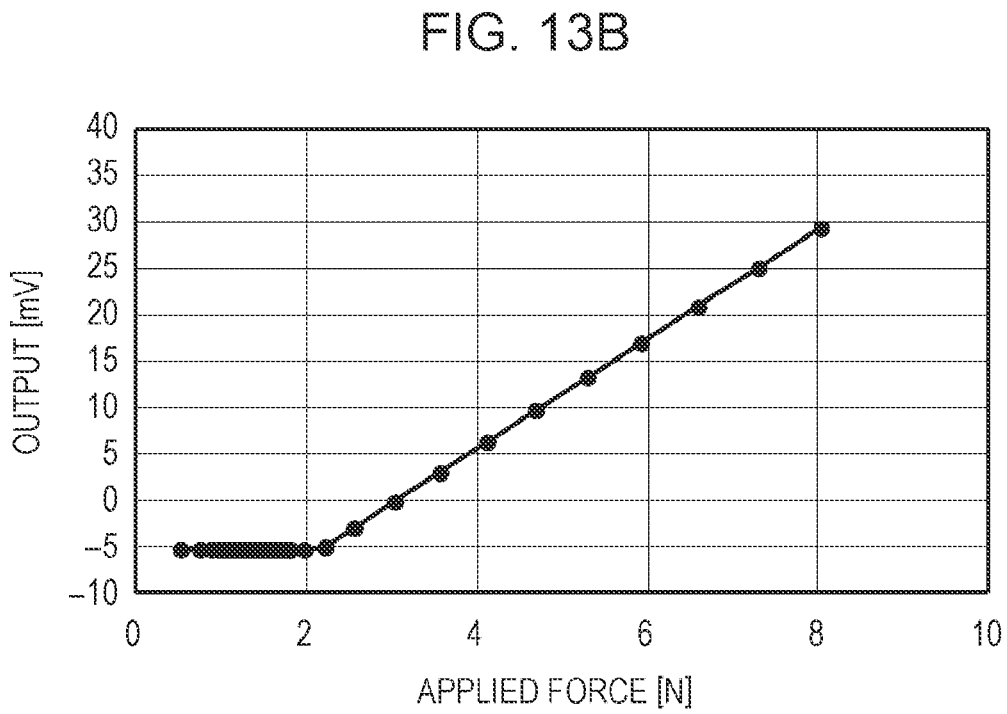
FIG. 13B is a graph showing the output characteristics of a load sensing apparatus.

FIGS. 13A and 13B are graphs showing the output characteristics of load sensing apparatuses. In FIGS. 13A and 13B, the horizontal axis represents the load, and the vertical axis represents the output value of the load sensing element 10. FIG. 13A shows the output characteristics of the load sensing apparatus 1. FIG. 13B shows the output characteristics of the load sensing apparatus 1B. Under the same load, the load sensing apparatus 1B obtains an output value about 1.6 times that of the load sensing apparatus 1.

Even with the load sensing apparatus 1B including the stiff plate 60, the prestroke region R1 (see FIG. 4B) was set using the gap d provided between the stiff pressing portion 32 and the pressure sensing portion 11 of the load sensing element 10, in the load sensing apparatus 1. In this case, the length from the start of application of the load to the predetermined stroke S1, that is, the prestroke region R1, can be set using the thickness of the stiff plate 60. In other words, the thinner the stiff plate 60, the larger the gap d, and the larger the prestroke region R1. In contrast, the thicker the stiff plate 60, the smaller the gap d, and the smaller the prestroke region R1.

<Other Examples of Elastic Supporting Portion>

Figure 14A:
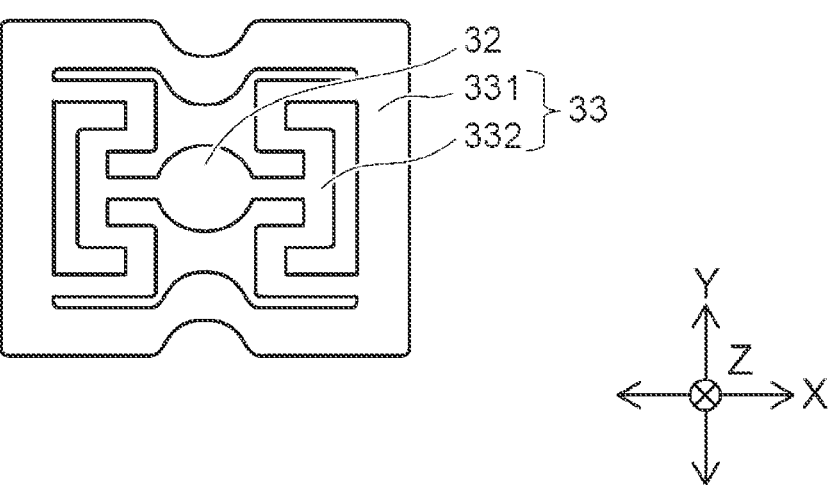
FIG. 14A is a plan views of another example (1) of the elastic supporting portion.
Figure 14B:
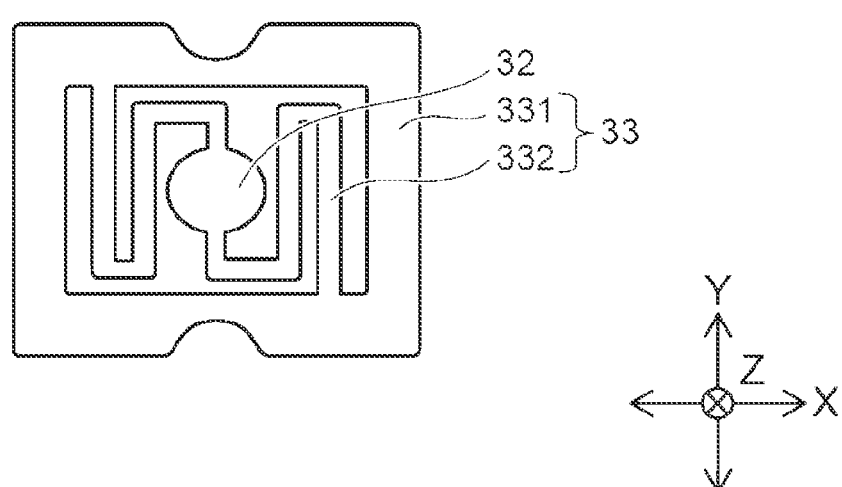
FIG. 14B is a plan views of another example (2) of the elastic supporting portion.
Figure 14C:
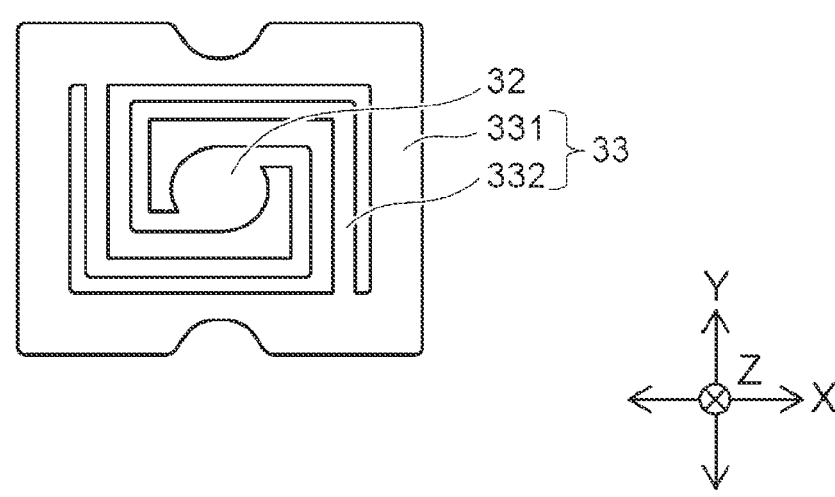
FIG. 14C is a plan views of another example (3) of the elastic supporting portion.

FIGS. 14A to 14C are plan views of other examples of the elastic supporting portion. FIG. 14A shows another example (1) of the elastic supporting portion 33. FIG. 14B shows another example (2) of the elastic supporting portion 33. FIG. 14C shows another example (3) of the elastic supporting portion 33.

As shown in FIGS. 14A to 14C, the arm 332 of the elastic supporting portion 33 may have various shapes. In FIG. 14A, the arm 332 is disposed axisymmetrically about the stiff pressing portion 32 disposed at the center. In FIGS. 14B and 14C, the arm 332 is disposed symmetrically about a point with respect to the stiff pressing portion 32 disposed at the center. In FIG. 14B, the arm 332 has a turned over shape. In FIG. 14C, the arm 332 has a spiral shape.

Such shapes of the arm 332 make the stiff pressing portion 32 likely to be deformed elastically in the direction of proximity to the pressure sensing portion 11 (Z-direction) but make the stiff pressing portion 32 difficult to be elastically deformed in another direction (for example, the in-plane direction of the frame 331, the X-Y direction). In other words, the arm 332 has an anisotropic nature in ease of elastic deformation. For this reason, the load applied to the plate 50 is efficiently transmitted to the pressure sensing portion 11. Even if the direction of the load applied to the plate 50 varies, the elastic member 31 can receive the load properly by being elastically deformed, and the anisotropic arm 332 can efficiently transmit the load received by the elastic member 31 toward the pressure sensing portion 11 (Z-direction). In particular, the shape of the elastic supporting portion 33 shown in FIG. 14A has a high anisotropic effect of elastic deformation, increasing the reliability of contact with the pressure sensing portion 11. With the shapes of the elastic supporting portion 33 shown in FIGS. 14B and 14C, the arm 332 is long and easily elastically deformed, easily providing a soft prestroke feeling.

The spring structure of the elastic supporting portion 33 allows the stiff pressing portion 32 disposed at the center to be supported at a predetermined spring constant. In this spring structure, the longer and the narrower the arm 332, the smaller the spring constant (easily deformed under a small load). Likewise, the thinner the arm 332, the smaller the spring constant. In the case of stainless steel, the arm 332 preferably has a thickness of about 0.2 mm in consideration of the strength of the stiff pressing portion 32.

Reducing the deformation of the stiff pressing portion 32 in the in-plane direction supported by the arm 332 allows reducing the risk of wear due to the contact between the stiff pressing portion 32 and the pressure sensing portion 11 of the load sensing element 10, allowing providing more reliable products.

Figure 15A:
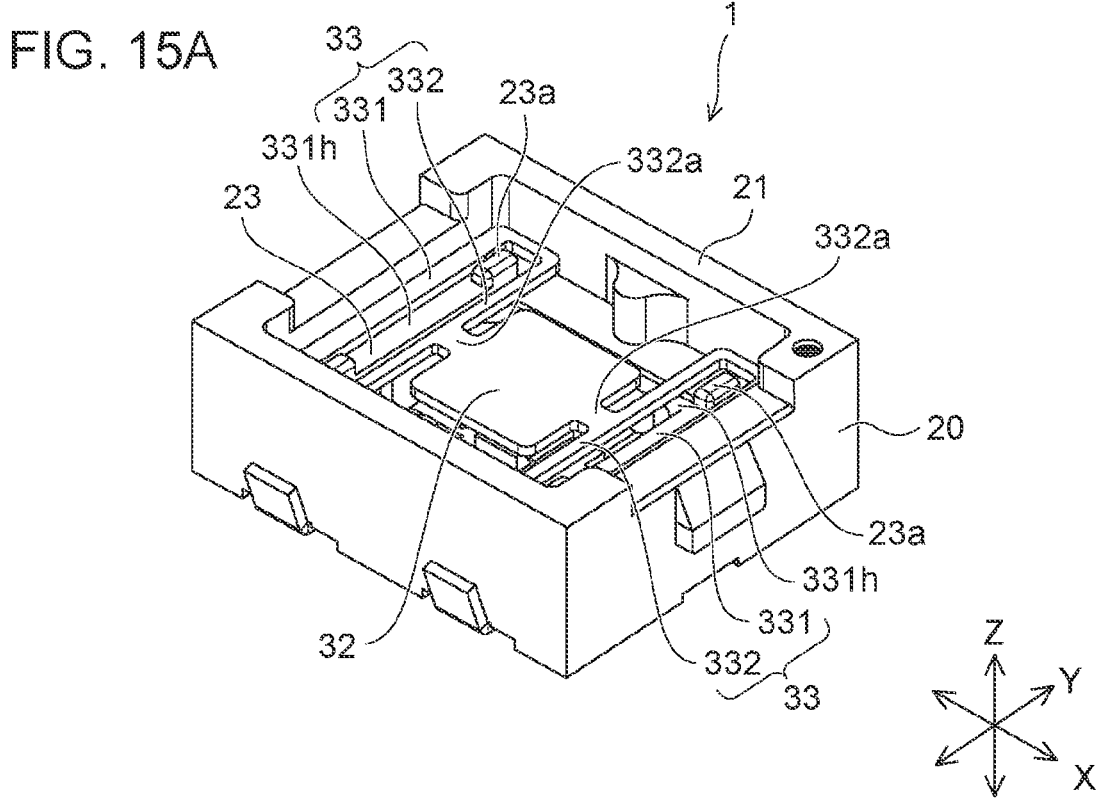
FIG. 15A is a perspective view of another example (4) of the elastic supporting portion.
Figure 15B:
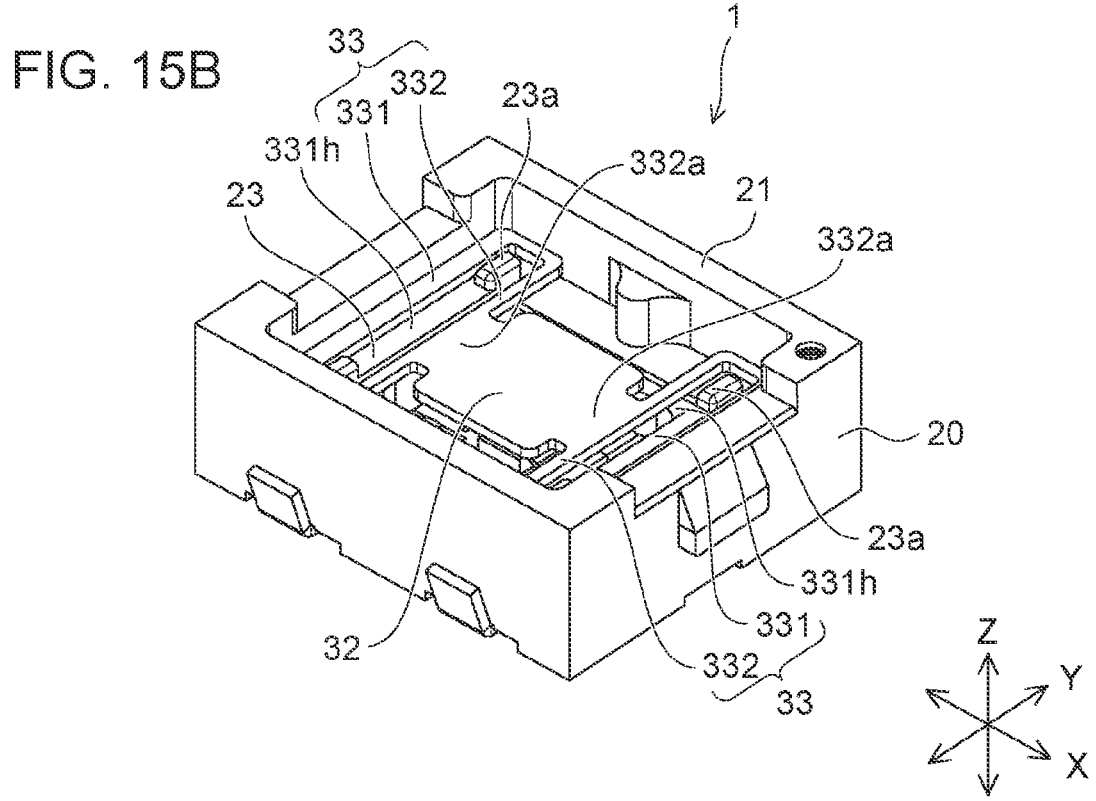
FIG. 15B is a perspective view of another example (5) of the elastic supporting portion.
Figure 16A:
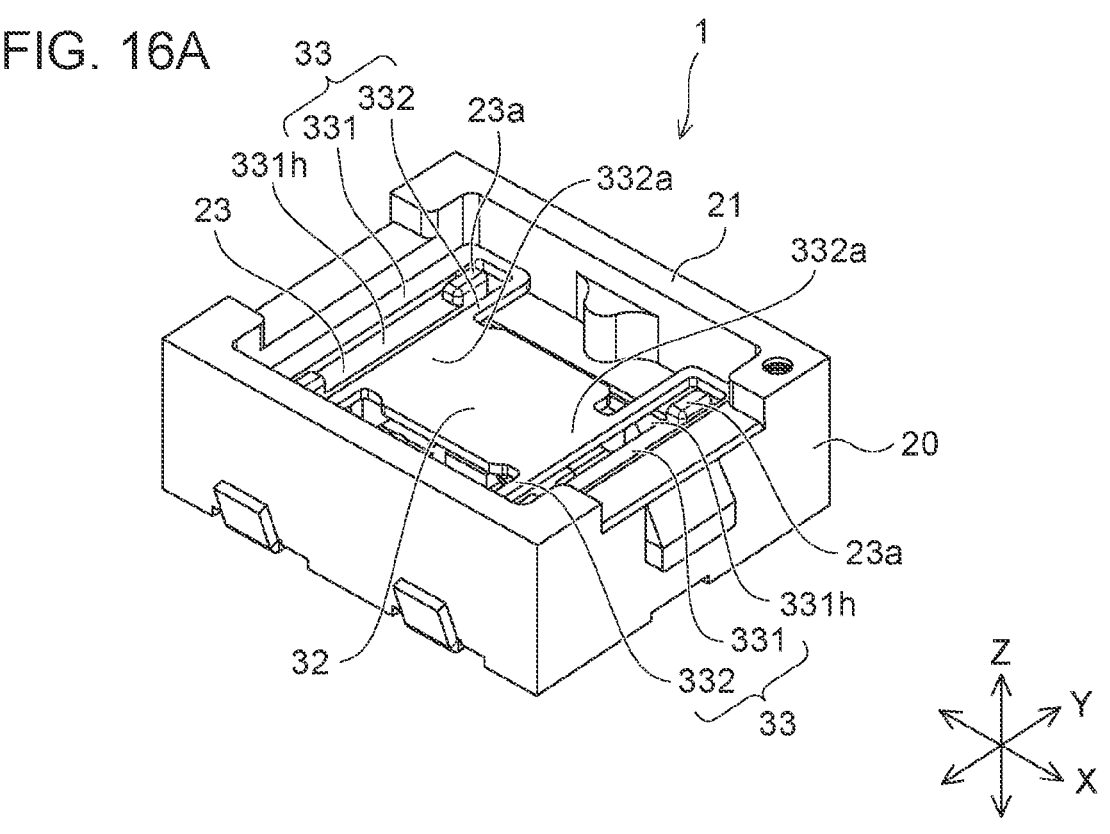
FIG. 16A is a perspective view of another example (6) of the elastic supporting portion.
Figure 16B:
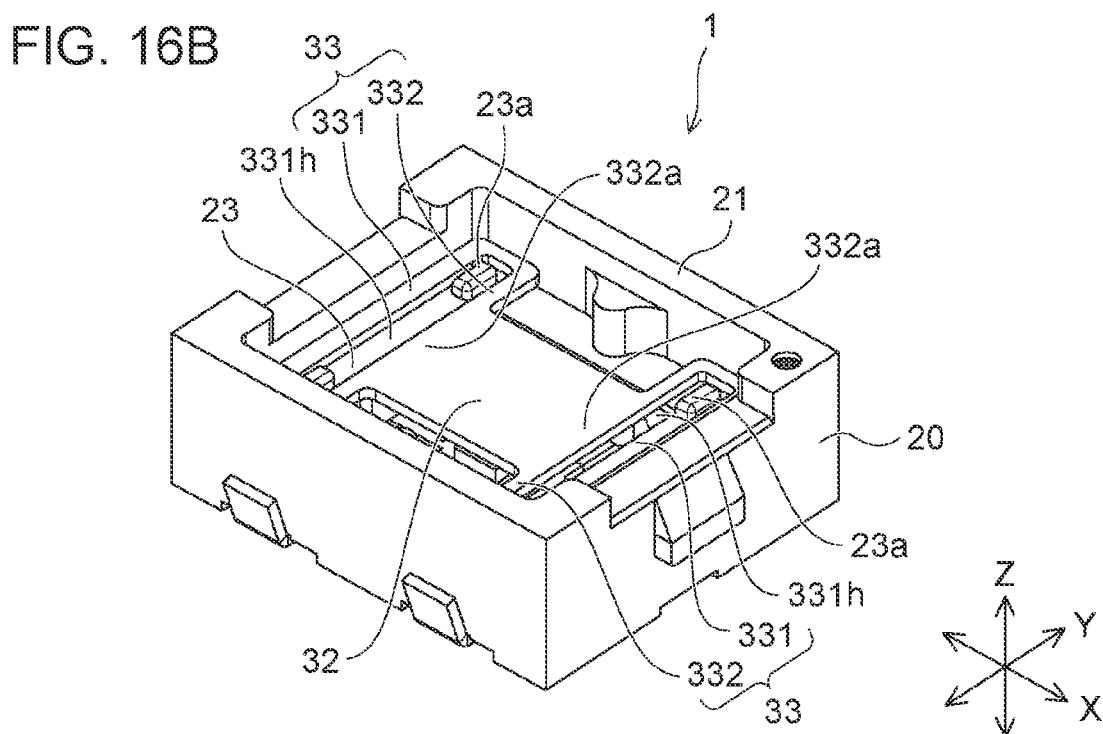
FIG. 16B is a perspective view of another example (7) of the elastic supporting portion.

FIG. 15A is a perspective view of another example (4) of the elastic supporting portion. FIG. 15B is a perspective view of another example (5) of the elastic supporting portion. FIG. 16A is a perspective view of another example (6) of the elastic supporting portion. FIG. 16B is a perspective view of another example (7) of the elastic supporting portion. Any of the above diagrams shows a state in which the elastic member 31 is removed for the convenience of description.

In other examples (4) to (7) of the elastic supporting portion 33, the frame 331 has positioning holes 331h. The level-difference portion 23 of the housing 20 on which the frame 331 is to be placed has protrusions 23a for positioning. When the frame 331 is placed on the level-difference portion 23, the protrusions 23a are fitted in the positioning holes 331h to locate the elastic supporting portion 33.

The elastic supporting portions 33 shown in FIG. 15A to FIG. 16B differ in the width (Y-direction) of joining portions 332a of the respective arms 332 joining to the stiff pressing portion 32. In other words, the width of the joining portion 332a of the arm 332 of the elastic supporting portion 33 shown in FIG. 15A is the smallest, and the widths of the joining portions 332a of the arms 332 shown in FIGS. 15B, 16A, and 16B increase in this order. The spring constant decreases to facilitate obtaining a soft prestroke feeling as the width of the joining portion 332a of the arm 332 of the elastic supporting portion 33 decreases. In contrast, the spring constant increases to facilitate obtaining a pushing feeling as the width of the joining portion 332a of the arm 332 increases.

<Other Examples of Elastic Member>

Figure 17:
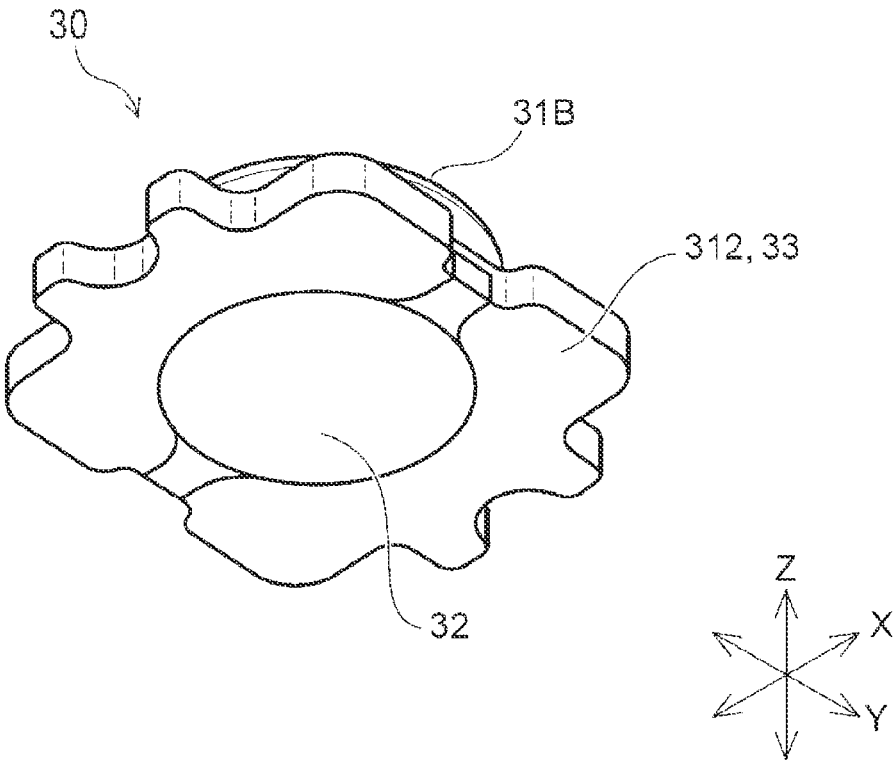
FIG. 17 is a perspective view of another example (1) of the elastic member.

FIG. 17 is a perspective view of another example (1) of the elastic member. An elastic member 31B shown in FIG. 17 doubles as the elastic supporting portion 33. In other words, the elastic supporting portion 33 is part of the elastic member 31B. Specifically, the stiff pressing portion 32 is fitted in a surface of the elastic member 31B adjacent to the load sensing element 10, and the flange 312 of the elastic member 31 also has the function of the elastic supporting portion 33 that supports the stiff pressing portion 32. The use of the elastic member 31B eliminates the need for the plate-like elastic supporting portion 33 shown in FIG. 2, simplifying the configuration of the pressing member 30.

Figure 18A:
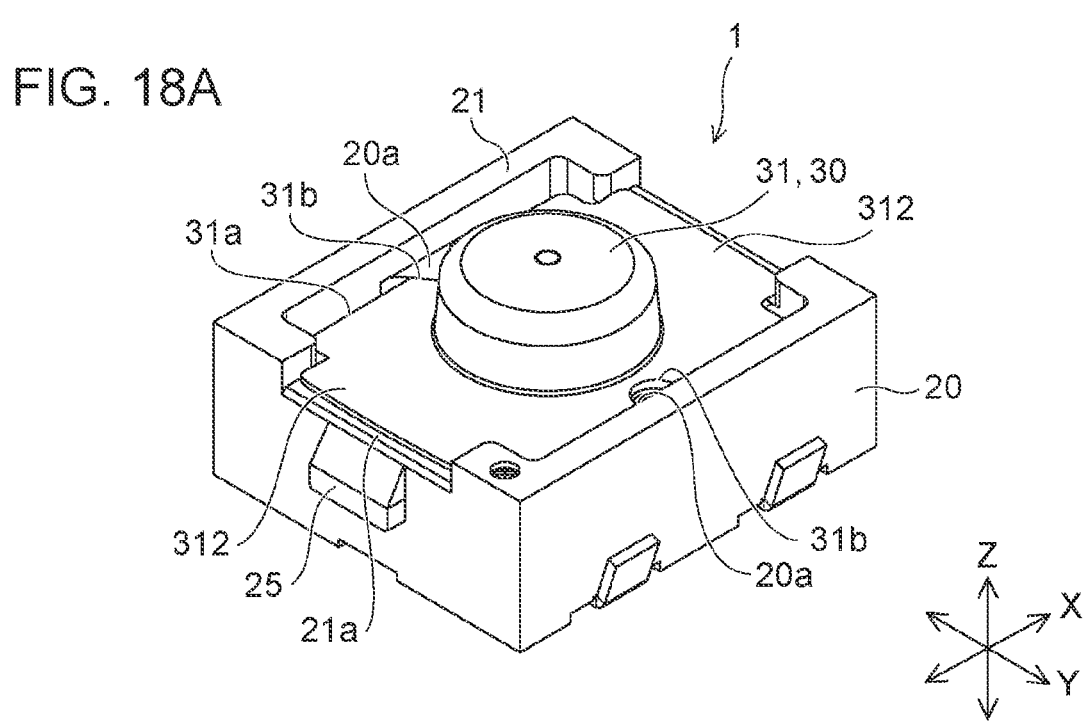
FIG. 18A is a perspective view of another example (2) of the elastic member.
Figure 18B:
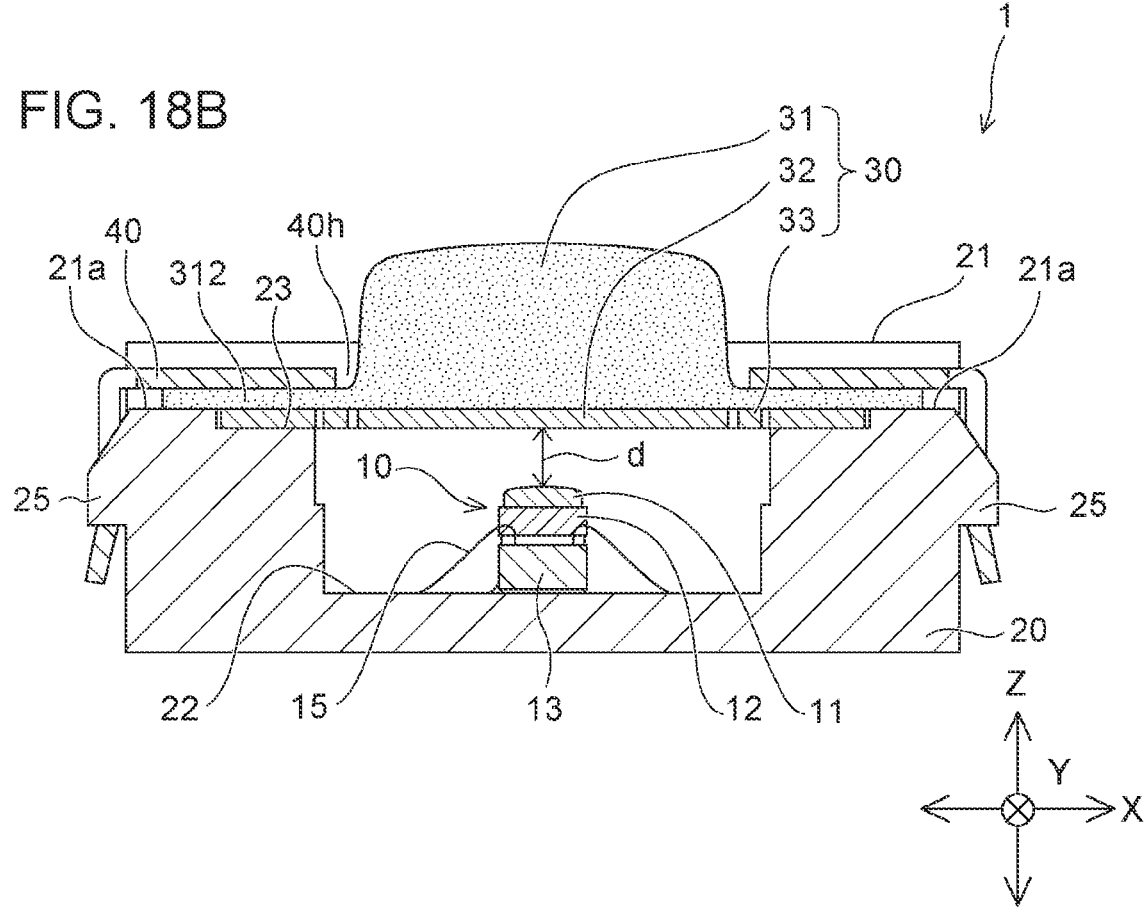
FIG. 18B is a cross-sectional view of another example (2) of the elastic member.

FIG. 18A is a perspective view of another example (2) of the elastic member. FIG. 18A shows a state in which the frame 40 is removed for the convenience of description. FIG. 18B is a cross-sectional view of another example (2) of the elastic member.

In another example (2) of the elastic member 31, the flange 312 of the elastic member 31 extends in the X-direction to the edge 21 of the housing 20. The edge 21 of the housing 20 includes steps 21a. The flange 312 of the elastic member 31 is placed on the steps 21a of the edge 21. Sides 31a of the elastic member 31 opposing the edge 21 include recessed portions 31b. The recessed portions 31b engage with protruding portions 20a of the housing 20 to position the elastic member 31. By placing the frame 40 over the housing 20, the elastic member 31 is sandwiched between the frame 40 and the housing 20. Providing the elastic member 31 with the flange 312 allows the flange 312 to be sandwiched between the frame 40 and the housing 20, thereby effectively preventing the elastic member 31 from coming off when a lateral force is applied to the elastic member 31.

Figure 19:
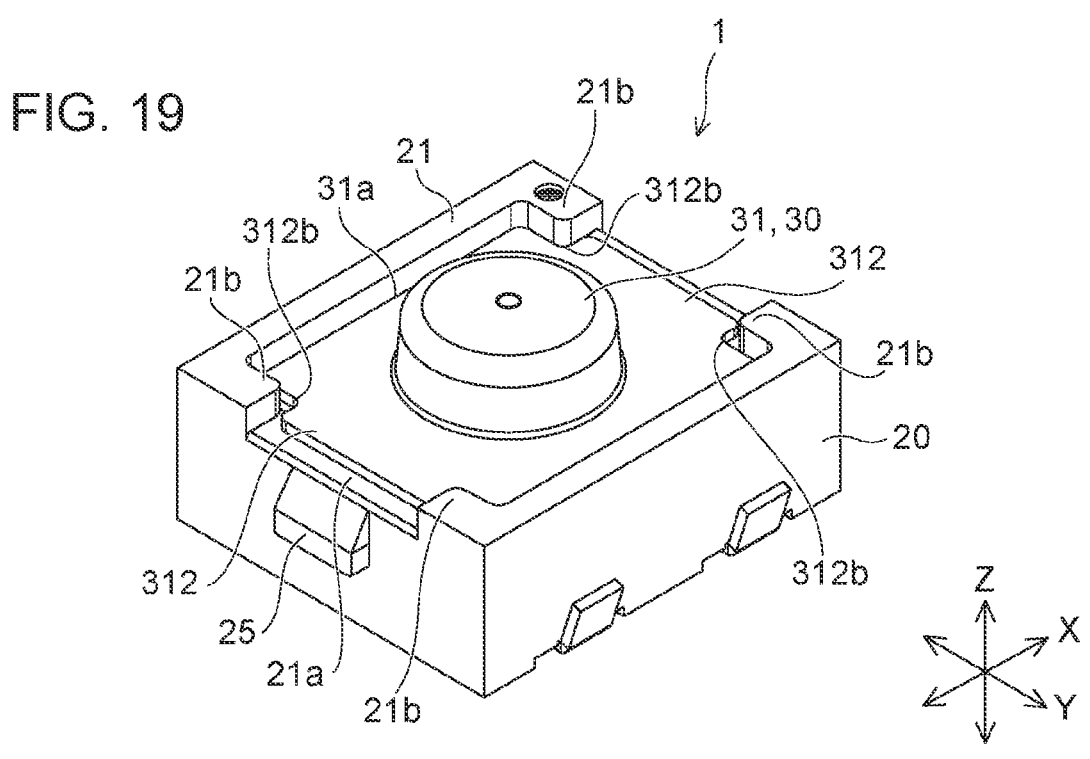
FIG. 19 is a perspective view of another example (3) of the elastic member.

FIG. 19 is a perspective view of another example (3) of the elastic member. In another example (3) of the elastic member 31, the flange 312 of the elastic member 31 extends in the X-direction to the edge 21 of the housing 20, and the flange 312 is placed on the steps 21a of the edge 21. Although another example (3) of the elastic member 31 does not include the recessed portions 31b, the elastic member 31 is positioned by the contact between the sides 31a of the elastic member 31 and the inner peripheral surface of the housing 20 and the engagement of inward protruding portions 21b provided at the four corners of the edge 21 with notches 312b of the flange 312. In another example (3) of the elastic member 31 also, the elastic member 31 is sandwiched between the frame 40 and the housing 20 by placing the frame 40 over the housing 20. Providing the elastic member 31 with the flange 312 allows the flange 312 to be sandwiched between the frame 40 and the housing 20, thereby effectively preventing the elastic member 31 from coming off when a lateral force is applied to the elastic member 31.

Figure 20:
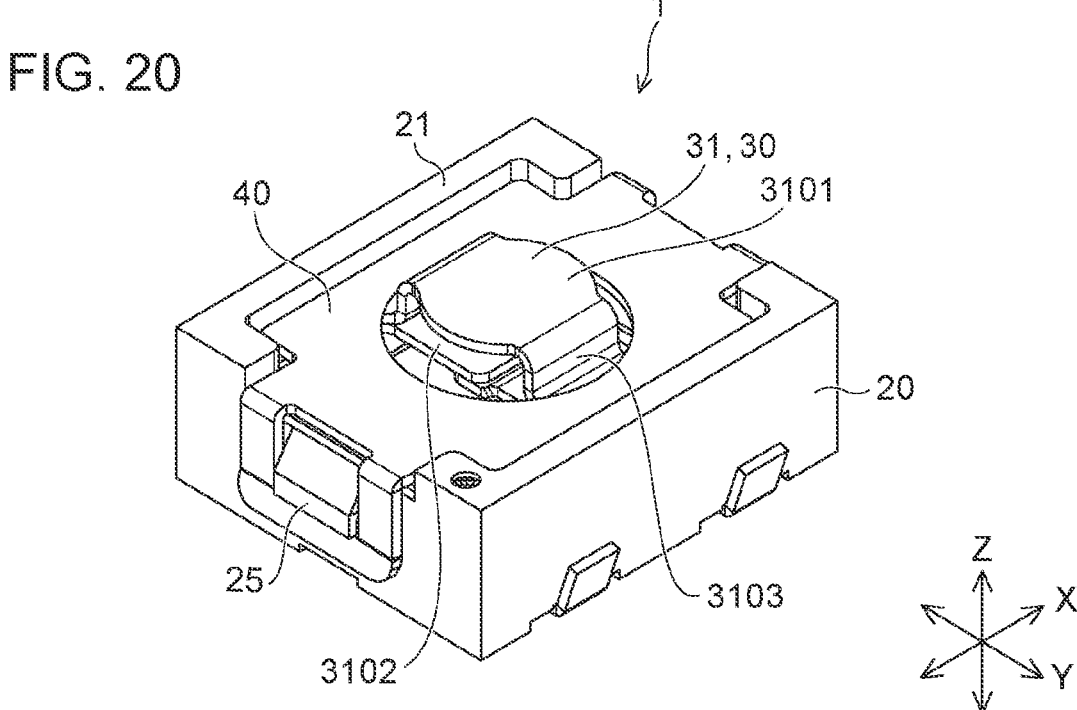
FIG. 20 is a perspective view of a load sensing apparatus including another example (4) of the elastic member.
Figure 21:
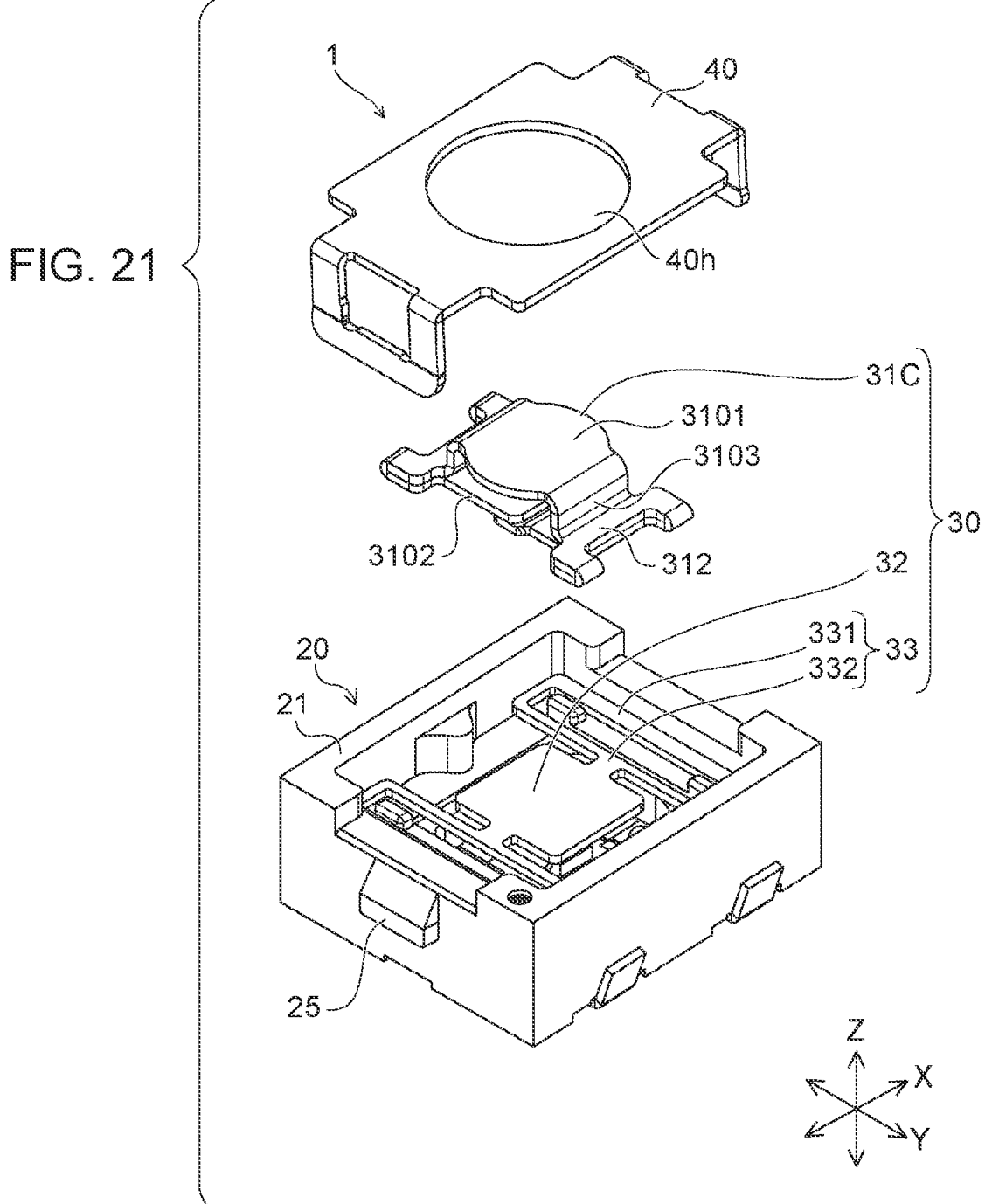
FIG. 21 is an exploded perspective view of the load sensing apparatus including another example (4) of the elastic member.

FIG. 20 is a perspective view of a load sensing apparatus including another example (4) of the elastic member. FIG. 21 is an exploded perspective view of the load sensing apparatus including another example (4) of the elastic member. FIG. 22 is a cross-sectional view of the load sensing apparatus including another example (4) of the elastic member. FIG. 23 is a cross-sectional view of another example (4) of the elastic member.

An elastic member 31C according to another example (4) is made of metal. For example, the elastic member 31 is formed by bending a metal plate. The elastic member 31C includes a first contact portion 3101 including a first contact point CP1 that receives a load, second contact portions 3102 including a second contact point CP2 that is in contact with the stiff pressing portion 32, and vertical portions 3103 provided between the first contact portion 3101 and the second contact portions 3102 to provide a space S between the first contact portion 3101 and the second contact portions 3102.

In this elastic member 31C, the first contact portion 3101 and the vertical portions 3103 form a convex shape. This convex shape serves as the protruding portion 311. The second contact portions 3102 face the first contact portion 3101 and have an interval from the first contact portion 3101 according to the height of the vertical portions 3103. This interval forms the space S between the first contact portion 3101 and the second contact portions 3102.

The elastic member 31C is formed by bending, for example, a metal plate, to integrally form the first contact portion 3101, the second contact portions 3102, and the vertical portions 3103. The opposite ends of the metal plate are joined (for example, welded) to form the elastic member 31C having an annular portion. The inside of the annular portion is the space S.

Specifically, the first contact portion 3101 including first contact point CP1 and extending in the lateral direction (the direction along the X-Y plane) is formed of a metal plate, and the two vertical portions 3103 are formed by bending the plates at the opposite ends of the first contact portion 3101 downward at substantially right angles. The second contact portions 3102 are formed by bending the plate from the vertical portions 3103 to the opposite side from the lateral first contact portion 3101 and folding back the plate 180 degrees at predetermined positions.

The opposite ends of the metal plate of the second contact portions 3102 may be joined together in overlapped state or with the end faces butted. The overlapped joining is preferable from the viewpoint of joining strength. Since the overlapped portion functions as the stiff plate 60, the sensitivity can be enhanced. The flange 312 of the elastic member 31C is formed by folding the metal plate from the vertical portions 3103 to the second contact portions 3102 so as to extend laterally.

FIGS. 24A and 24B are cross-sectional views of a load sensing apparatus including another example (4) of the elastic member illustrating the operation thereof. FIGS. 25A and 25B are cross-sectional views of a load sensing apparatus including an elastic member of a comparable example illustrating the operation thereof.

FIG. 24A shows a state before the load sensing apparatus 1 including the elastic member 31C is subjected to a load. FIG. 24B shows a state in which the load sensing apparatus 1 including the elastic member 31C is subjected to a load. When a load is applied to the elastic member 31C on which the plate 50 is placed, the load received at the first contact point CP1 of the first contact portion 3101 is applied to the stiff pressing portion 32 that is in contact with the second contact point CP2 of the second contact portions 3102.

The application of the load to the stiff pressing portion 32 causes the elastic supporting portion 33 to bend to bring the stiff pressing portion 32 close to the pressure sensing portion 11 of the load sensing element 10 into contact therewith. When the stiff pressing portion 32 comes into contact with the pressure sensing portion 11, the second contact portions 3102 are elastically deformed toward the space S because of the resistance from the stiff pressing portion 32. The load from the plate 50 is transmitted to the stiff pressing portion 32 via the elastic member 31C and is transmitted from the stiff pressing portion 32 to the load sensing element 10 via the pressure sensing portion 11.

FIG. 25A shows a state before the load sensing apparatus 1 including the elastic member 31D of the comparative example is subjected to a load. FIG. 25B shows a state in which the load sensing apparatus 1 including the elastic member 31D of the comparative example is subjected to a load. Although the elastic member 31D of the comparable example is formed by bending a metal plate, as is the elastic member 31C, the ends of the second contact portions 3102 (the ends of the metal plate) are not joined together.

When a load is applied to the elastic member 31D on which the plate 50 is placed, the load received by the first contact portion 3101 is applied to the stiff pressing portion 32 that is in contact with the second contact portions 3102. The application of the load to the stiff pressing portion 32 causes the elastic supporting portion 33 to bend to bring the stiff pressing portion 32 close to the pressure sensing portion 11 of the load sensing element 10 into contact therewith. When the stiff pressing portion 32 comes into contact with the pressure sensing portion 11, the second contact portions 3102 are elastically deformed toward the space S because of the resistance from the stiff pressing portion 32.

Since the ends of the second contact portions 3102 are not joined together, the two second contact portions 3102 move in the expanding direction with application of the load. The expansion of the two second contact portions 3102 causes the protruding portion 311 to collapse such that portions of the vertical portions 3103 adjacent to the second contact portions 3102 (lower parts) expand. Thus, in the elastic member 31D, the protruding portion 311 is more prone to collapse than that of the elastic member 31C.

In a simulation, when the same pressure was applied to the first contact portion 3101 of the elastic member 31C and the first contact portion 3101 of the elastic member 31D, the force transmitted to the stiff pressing portion 32 via the second contact portions 3102 of the elastic member 31D was one fifth of the force transmitted to the stiff pressing portion 32 via the second contact portions 3102 of the elastic member 31C. This simulation showed that the load sensing apparatus 1 including the elastic member 31C with a structure in which the elastic deformation of the second contact portions 3102 occurs earlier than the elastic deformation of the vertical portions 3103 could transmit the load from the plate 50 to the load sensing element 10 more efficiently than the load sensing apparatus 1 including the elastic member 31D with a structure in which the elastic deformation of the vertical portions 3103 occurs earlier than the elastic deformation of the second contact portions 3102. In the case where the elastic member including the first contact portion 3101, the second contact portions 3102, and the vertical portions 3103 is formed by bending a metal plate, and the second contact portions 3102 are formed of the opposite ends of the metal plat, the pressure that the first contact portion 3101 receives can be transmitted to the stiff pressing portion 32 efficiently by forming the second contact portions 3102 by joining the opposite ends of the metal plate together, as is the elastic member 31C.

<Example of Load Sensing Apparatus Including Integrated Circuit>

FIGS. 26A and 26B are cross-sectional views of a load sensing apparatus including an integrated circuit. An integrated circuit 70 used in the load sensing apparatus 1C is an application specific integrated circuit (ASIC) that converts an analog signal, for example, an output from the load sensing element 10, to a digital signal. The integrated circuit 70 may be a circuit other than that for signal conversion.

The integrated circuit 70 has the load sensing element 10 thereon. In other words, the housing space 22 of the housing 20 houses the integrated circuit 70 and the load sensing element 10 layered therein. This allows providing a package configuration of one load sensing apparatus 1C including the integrated circuit 70.

FIG. 26A illustrates an example in which the housing 20 of the load sensing apparatus 1C is made of a mold resin. FIG. 26B illustrates an example in which the housing 20 of the load sensing apparatus 1C is made of ceramic. Using a mold resin for the housing 20 allows providing a low-price light weight load sensing apparatus 1C. Using ceramic for the housing 20 allows forming a fine metalizing pattern on the housing 20, thereby thinning the electrical connection to the integrated circuit 70.

<Example of Load Sensing Apparatus Including Cover>

FIG. 27 is a perspective view of an example of a load sensing apparatus including a cover. FIG. 28 is an exploded perspective view of an example of the load sensing apparatus including the cover. FIG. 29 is a cross-sectional view of an example of the load sensing apparatus including the cover. FIG. 30 is an enlarged cross-sectional view of an example of the load sensing apparatus including the cover.

A load sensing apparatus 1D includes a cover 80 disposed at the opposite side from the housing 20 of the pressing member 30. The housing 20 of the load sensing apparatus 1D includes a restricting portion 27 that restricts the motion of the stiff pressing portion 32 in the directions (X-direction and Y-direction) perpendicular to the pushing direction (Z-direction). Specifically, the restricting portion 27 is a hole provided in the housing 20. The hole houses the load sensing element 10 and the pressing member 30 (the elastic member 31, the stiff pressing portion 32, and the elastic supporting portion 33). The load sensing apparatus 1D includes the stiff plate 60 between the elastic member 31 and the stiff pressing portion 32. The stiff plate 60 may be provided as need arises.

The lengths of the hole of the restricting portion 27 in the X-direction and the Y-direction are fixed in the Z-direction. The pressing member 30 is slidable in the Z-direction in the hole of the restricting portion 27 but is restricted in movement in the X-direction and the Y-direction.

The cover 80 includes a protruding portion 81 that comes into contact with the elastic member 31. This allows a load, when applied from the cover 80, to be transmitted through the protruding portion 81 to the elastic member 31 and to the pressure sensing portion 11 of the load sensing element 10 via the stiff pressing portion 32. At that time, the movement of the pressing member 30 in the X-direction and the Y-direction is restricted by the restricting portion 27 of the housing 20. For this reason, the movement of the stiff pressing portion 32 in the X-direction and the Y-direction is also restricted, and as a consequence, the friction between the stiff pressing portion 32 and the pressure sensing portion 11 in the X-direction and the Y-direction is reduced or eliminated. Accordingly, even if the pressure sensing portion 11 is made of a high-hardness low-toughness material, damage to the pressure sensing portion 11 due to the friction between the pressure sensing portion 11 and the stiff pressing portion 32 can be reduced or eliminated.

The protruding portion 81 of the cover 80 may be formed integrally with the elastic member 31, or the protruding portion 81 and the elastic member 31 may be connected together. This allows the load to be transmitted to the elastic member 31 through the protruding portion 81 of the cover 80 without loss.

The load sensing apparatus 1D preferably includes stoppers 85 for restricting a decrease in relative distance between the cover 80 and the housing 20. For example, the stoppers 85 are protrusions provided at portions of the cover 80 facing the housing 20 in the vicinity of the protruding portion 81. Pushing the cover 80 causes the stoppers 85 and the housing 20 to come into contact with each other, preventing further pushing of the cover 80. Thus, even if a load more than necessary is applied to the cover 80, an overload on the load sensing element 10 can be prevented. The stoppers 85 are preferably disposed in the vicinity of the protruding portion 81 of the cover 80. For example, when the cover 80 is pushed in, low stiffness of the cover 80 tends to cause deflection of the cover 80. Disposing the stoppers 85 in the vicinity of the protruding portion 81 provides a sufficient stopping effect when the load sensing element 10 is pushed by the protruding portion 81 even if the cover 80 is bent. The stoppers 85 may be preliminarily disposed at a position distant from the protruding portion 81. This provides the effect of reducing or eliminating the bending of the cover 80. The stoppers 85 may be provided at the cover 80 or at the housing 20. In other words, the stoppers 85 need only be disposed at positions where the cover 80 and the housing 20 face each other or may be provided at both the cover 80 and the housing 20.

Since the load sensing apparatus 1D includes the cover 80, the load sensing apparatus 1D may be used as a component disposed at a position of a product visible to the user. A specific example of such a component is a panel switch disposed indoors or in vehicles. An image display may be provided at the position of the cover 80 visible to the user. Adjusting a material (elastic modulus) for the elastic member 31 allows changing the pushing feeling of the cover 80 (the responsive touch of the panel switch). Adjusting the thickness of the elastic member 31 allows adjusting the surface position of the cover 80 (the touch position of the panel switch).

Thus, the embodiments allow providing the load sensing apparatuses 1, 1B, 1C, and 1D that provide high detection accuracy and linearity of the detected value against the load, and having sufficient assembly tolerances.

Having described the embodiments, it is to be understood that the present invention is not limited to the examples. For example, the shape of the arm 332 of the elastic supporting portion 33 is not limited to the above examples. It is to be understood that addition, deletion, and design change of components, as well as combinations of the features of the embodiments as appropriate, will occur to those skilled in the art without departing from the scope of the present invention.

What is claimed is:

1. A load sensing apparatus comprising:
   a load sensing element including a pressure sensing portion;
   a housing that houses the load sensing element; and
   a pressing member supported by the housing, the pressing member including:
      an elastic member configured to receive a load applied thereto;
      a stiff pressing portion made of a material harder than the elastic member, the stiff pressing portion being configured to come into contact with the pressure sensing portion; and
      an elastic supporting portion that supports the stiff pressing portion in the housing,
      wherein, when no load is applied to the pressing member, a gap is formed between the stiff pressing portion and the pressure sensing portion,
   and wherein the elastic supporting portion includes a plate spring having an arm.

2. The load sensing apparatus according to claim 1, wherein the elastic supporting portion is integrally formed with the stiff pressing portion.

3. The load sensing apparatus according to claim 1, wherein the pressing member further includes:
   a rigid plate provided between the elastic member and the stiff pressing portion.

4. The load sensing apparatus according to claim 1, wherein the load sensing element further includes:
   a displacement portion configured to be displaced in accordance with the load received by the pressure sensing portion; and
   a plurality of piezoresistive elements configured to electrically detect an amount of displacement of the displacement portion.

5. The load sensing apparatus according to claim 1, wherein the stiff pressing portion is made of metal.

6. The load sensing apparatus according to claim 1, wherein the stiff pressing portion is made of silicon.

7. The load sensing apparatus according to claim 1, wherein the elastic member is made of metal.

8. The load sensing apparatus according to claim 1, wherein the elastic member includes:
   a first contact portion including a first contact point configured to receive the load;

a second contact portion including a second contact point configured to come into contact with the stiff pressing portion; and
   a vertical portion extending from the first contact portion toward the second contact portion such that a space is formed between the first contact portion and the second contact portion,
   and wherein the second contact portion is further configured to elastically deformed toward the first contact portion via the space by resistance from the stiff pressing portion when the load is applied to the pressing member.

9. The load sensing apparatus according to claim 8, wherein the first contact portion, the second contact portion, and the vertical portion are integrally formed of a single piece of metal plate.

10. The load sensing apparatus according to claim 1, further comprising:
    an integrated circuit housed in the housing, the integrated circuit having the load sensing element thereon.

11. The load sensing apparatus according to claim 1, wherein the housing includes:
    a restricting portion configured to restrict movement of the stiff pressing portion in a direction perpendicular to a pressing direction.

12. The load sensing apparatus according to claim 1, further comprising:
    a cover disposed over the pressing member on an opposite side from the housing, the load being applied to the elastic member via the cover.

13. The load sensing apparatus according to claim 12, wherein the cover includes:
    a protruding portion configured to come into contact with the elastic member.

14. The load sensing apparatus according to claim 13, wherein the elastic member is integrated with the protruding portion.

15. The load sensing apparatus according to claim 12, further comprising:
    a stopper configured to restrict a decrease in a relative distance between the cover and the housing.

16. The load sensing apparatus according to claim 13, wherein the elastic member is connected to the protruding portion.

17. The load sensing apparatus according to claim 1, wherein the stiff pressing portion has an elastic modulus higher than that of the elastic member.

18. The load sensing apparatus according to claim 1, wherein the stiff pressing portion has such a stiffness that the pressure sensing portion is not pressed into the stiff pressing portion beyond a contact surface when the load is applied to the elastic member.

* * * * *